(12) United States Patent
Ushiro

(10) Patent No.: US 7,092,627 B2
(45) Date of Patent: Aug. 15, 2006

(54) SHOOTING SYSTEM AND SILVER-SALT CAMERA

(75) Inventor: Seimei Ushiro, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 903 days.

(21) Appl. No.: 10/233,428

(22) Filed: Sep. 4, 2002

(65) Prior Publication Data
US 2003/0043278 A1 Mar. 6, 2003

(30) Foreign Application Priority Data
Sep. 6, 2001 (JP) ............................. 2001-270746

(51) Int. Cl.
G03B 7/26 (2006.01)
G03B 17/48 (2006.01)
G03B 19/06 (2006.01)
G03B 41/00 (2006.01)
H04N 7/18 (2006.01)
H04N 5/225 (2006.01)

(52) U.S. Cl. ............... 396/303; 396/333; 396/429; 396/446; 348/64; 348/372; 348/375

(58) Field of Classification Search ............... 396/30, 396/287, 301, 303, 312, 333, 374, 429, 446; 348/64, 231.4, 333.02, 372, 375
See application file for complete search history.

(56) References Cited

U.S. PATENT DOCUMENTS

| | | | | |
|---|---|---|---|---|
| 3,883,883 A | * | 5/1975 | Sano et al. | 396/374 |
| 4,303,322 A | * | 12/1981 | Someya | 396/287 |
| 4,782,355 A | * | 11/1988 | Sakai et al. | 396/72 |
| 5,000,396 A | * | 3/1991 | Barrella | 396/387 |
| 5,452,000 A | * | 9/1995 | Sapir | 348/220.1 |
| 6,456,799 B1 | * | 9/2002 | Enderby | 396/323 |
| 6,496,656 B1 | * | 12/2002 | Nelson et al. | 396/312 |

FOREIGN PATENT DOCUMENTS

| | | |
|---|---|---|
| JP | 11-338047 | 12/1999 |
| JP | 2000-89345 | 3/2000 |
| JP | 2001-45351 | 2/2001 |

* cited by examiner

Primary Examiner—W. B. Perkey
(74) Attorney, Agent, or Firm—Sughrue Mion, PLLC

(57) ABSTRACT

A shooting system of the present invention comprises a silver-salt camera unit shooting on a silver-salt photosensitized material, an electronic image pickup unit which is detachably combined with the silver-salt camera unit and in which a solid image pickup element is embedded, and a control unit which is combined with the electronic image pickup unit instead of the silver-salt camera unit.

20 Claims, 21 Drawing Sheets

SHOOTING SYSTEM AND SILVER-SALT CAMERA

BACKGROUND OF THE INVENTION

1. Field of the Invention

The present invention relates to a shooting system which shoots on a mounted silver-salt photosensitized material and which shoots by means of a self-contained solid image pickup element, and to a silver-salt camera which shoots on a silver-salt photosensitized material.

2. Description of the Related Art

In addition to a conventional silver-salt camera which shoots a photograph on a silver-salt photosensitized material like a roll-shaped photo film or an instant camera film, an electronic camera which forms an image of a subject on a solid image pickup element to obtain electronic image data, thereby shooting a photograph has become widespread in recent years.

The silver-salt camera has a merit that the camera can shoot a photograph having excellent image quality as compared with the electronic camera, and the electronic camera has a merit that the shot image can be edited, that is impossible for the silver-salt camera.

Therefore, it is conceived to bring both the electronic camera and the silver-salt cameral in order to satisfy various shooting requirements, but there is problem that it is troublesome to carry these two cameras.

Thereupon, a compound camera in which these cameras are combined as one unit has been conceived (for example, see Japanese Patent Application Laid-Open No. 11-338047 and No. 2000-89345).

However, if the compound camera is used, even when only the electronic camera is to be used, the entire compound camera including the unnecessary silver-salt camera function must be carried, and when only the silver-salt camera is to be used, the entire compound camera including the unnecessary electronic camera function must be carried, and there is a problem that it is troublesome.

Japanese Patent Application Laid-Open No. 2001-45351 discloses an apparatus having a shooting section which is inserted into a camera body instead of a photo film. In this case, however, if the photo film is once mounted, photographs can be taken only on the photo film until shooting onto the photo film is completed, and if the shooting section is inserted instead of the photo film, the camera functions only as an electronic camera, and it is not possible to select appropriate camera or use the both functions at the same time.

SUMMARY OF THE INVENTION

The present invention has been achieved in the view of the above circumstances, and it is an object of the invention to provide a shooting system, and a silver-salt camera which can easily be carried while having a function of a compound camera.

To achieve the above object, the present invention provides a shooting system comprising a silver-salt camera unit to which a silver-salt photosensitized material is mounted and which shoots on the mounted silver-salt photosensitized material, and an electronic image pickup unit in which a solid image pickup element is embedded and which forms an image of a subject on the embedded solid image pickup element, thereby obtaining image data, and which is detachably combined with the silver-salt camera unit, in which in a state in which the electronic image pickup unit is combined with the silver-salt camera unit, both or one of photograph shooting onto the silver-salt photosensitized material in the silver-salt camera unit and photograph shooting by taking image data in the electronic image pickup unit can be carried out by shooting operation to the silver-salt camera unit, wherein the silver-salt camera unit comprises an electricity supplying section which supplies electricity into the silver-salt camera unit and which supplies electricity also to the electronic image pickup unit in a state in which the electronic image pickup unit is combined.

According to the shooting system of the present invention, with the above structure, if the electronic image pickup unit is combined with the silver-salt camera unit, it is possible to use the electronic camera and the silver-salt camera shooting on the photosensitized material as an integral compound camera, and with only the silver-salt camera unit, it can be used as a conventional camera. "Both or one of photograph shooting" in the present invention means photograph shooting of both the silver-salt camera unit and electronic image pickup unit in a state in which they are combined, photograph shooting only by the silver-salt camera unit and photograph shooting only by electronic image pickup unit, based on shooting operation with respect to the silver-salt camera unit.

Here, the silver-salt camera unit comprises a display section having a function for displaying information and a function for displaying an image based on image data obtained by the solid image pickup element in a state in which the electronic image pickup unit is combined.

With this structure, the image taken by shooting can be checked instantly.

The silver-salt camera unit preferably has an image storing section for storing image data obtained by the electronic image pickup unit, the above electronic image pickup unit preferably has an image transferring section for transferring image data obtained by the electronic image pickup unit to the silver-salt camera unit in a state in which the silver-salt camera unit is combined.

With this structure, since image data obtained by the electronic image pickup unit can be stored in a memory on the side of the silver-salt camera unit having relatively sufficient capacity and thus, it is possible to reduce a memory in the electronic image pickup unit in size. With this, it is possible to make the outward size of the shooting system compact.

The shooting system of the present invention preferably has a control unit having a shooting instruction operating section for instructing the electronic image pickup unit to shoot, and an electricity supplying section for supplying electricity to the electronic image pickup unit in a state in which the electronic image pickup unit is combined with the control unit.

With the above structure, the shooting system of the present invention can be used as an electronic camera.

Here, the above control unit may include an image storing section which stores image data obtained by the electronic image pickup unit, the electronic image pickup unit may include an image transferring section which transfers image data obtained by the electronic image pickup unit to the control unit in a state in which the electronic image pickup unit is combined with the control unit.

With this, image data obtained by shooting in the electronic image pickup unit can be stored in a memory on the side of the control unit having relatively sufficient capacity and thus, it is possible to reduce a memory of the electronic image pickup unit in size and it is possible to make the shooting system compact.

The control unit may include a music storing section which stores music data, and music can be replayed based on music data stored in the music storing section.

With this, it is possible to listen to music with this shooting system.

Here, preferably, the silver-salt photosensitized material is a roll-shaped silver-salt photo film on which the silver-salt camera unit shoots.

Also, preferably, the silver-salt photosensitized material is an instant photograph film sheet which is irradiated with exposure light, discharged and developed, and provided with developing liquid halfway of the discharge process, the silver-salt camera unit is an instant camera unit which has a film pack mounting chamber to which a film pack having the instant photograph film sheets being laminated is mounted, shoots on the instant photograph film sheets in the film pack mounted to the film pack mounting chamber, and discharges the exposed film sheets.

Further, it is acceptable that a shooting system according to the present invention comprises an instant camera unit as well as the silver-salt camera unit which shoots on the roll-shaped silver-salt photo film, wherein the instant camera unit is combined with the electronic image pickup unit, has a film pack mounting chamber to which a film pack having the instant photograph film sheets being laminated, irradiated with exposure light, discharged, and developed after being provided with developing liquid halfway of the discharge process is mounted, shoots on the film sheets in the film pack mounted to the film pack mounting chamber, and discharges the exposed film sheets, in a state in which the electronic image pickup unit is combined, the instant camera unit can carry out, by shooting operation to the instant camera unit, one of or both of photograph onto the film sheet in the instant camera and photograph by taking image data in the electronic image pickup unit, the instant camera unit includes an electricity supplying section which supplies electricity into the instant camera unit and supplies electricity also to the electronic image pickup unit in a state in which the electronic image pickup unit is combined.

In the shooting system of the present invention having the above structure, when the silver-salt camera as well as the instant camera unit which is combined with the electronic image pickup unit, shoots on the film sheets, and discharges the exposed film sheets are provided, it is possible to use it as a compound camera in which an instant camera and electronic camera are integrated by combining the instant camera unit and the electronic image pickup unit, and it is possible to use it as a compound camera in which a normal camera and electronic camera are integrated by combining the silver-salt camera unit shooting on the roll-shaped silver-salt photo film and the electronic image pickup unit. With only the instant camera unit, it is possible to use it as the instant camera which is equal to the compound camera from which the electronic camera is removed, and with only the silver-salt camera unit shooting on the roll-shaped silver-salt photo film, it is possible to use it as the normal camera equal to the compound camera from which the electronic camera is removed. "Both or one of photograph shooting" in the present invention means, based on shooting operation with respect to the instant camera unit in a state in which the instant camera unit and electronic image pickup unit are combined, photograph shooting of both of them, photograph shooting only by the instant camera unit and photograph shooting only by electronic image pickup unit.

Here, it is acceptable that the electronic image pickup unit includes an image transferring section which transfers image data obtained by the electronic image pickup unit to the instant camera unit in a state in which the electronic image pickup unit is combined with the instant camera unit, the instant camera unit includes an image storing unit which is detachably mounted to the film pack mounting chamber instead of a film pack and which stores image data obtained by the electronic image pickup unit.

With this, image data obtained by shooting operation by the electronic image pickup unit can be stored in the instant camera unit side having relatively sufficient capacity and thus, it is possible to make the shooting system compact and it is possible to use it as the electronic camera having a detachably mounted memory while using the function of the instant camera.

Further, it is acceptable that the instant camera unit can be coupled to the electronic image pickup unit rotated by 90° with respect to the instant camera unit.

With this structure, it is possible to dispose the electronic camera unit horizontally or vertically while disposing the instant camera unit vertically.

In addition, it is preferable that the electronic image pickup unit of the shooting system of this invention has a curved surface which comes into contact with a member with which the electronic image pickup unit is combined.

With this, the electronic image pickup unit can be combined utilizing a space around the lens barrel.

Further, to achieve the above object, the present invention provides a silver-salt camera in which a silver-salt photosensitized material is mounted and shooting is carried out on the silver-salt photosensitized material, comprising a coupling section which is detachably combined with an electronic image pickup unit into which a solid image pickup element is embedded, and which forms an image of a subject on the solid image pickup element to obtain image data, an electricity supplying section which supplies electricity into the silver-salt camera, and which supplies electricity also to the electronic image pickup unit in a state in which the electronic image pickup unit is combined, and a switching section for switching both or one of photograph shooting onto a silver-salt photosensitized material in the silver-salt camera and a photograph shooting by taking image data in the electronic image pickup unit by shooting operation to the silver-salt camera in a state in which the electronic image pickup unit is combined with the silver-salt camera.

The silver-salt camera of the present invention can be used as a compound camera in which the electronic camera and the conventional camera are integrally formed by combining the silver-salt camera and the electronic image pickup unit based on the above structure, and with only the silver-salt camera, it is possible to use it as the conventional camera. "Both or one of photograph shooting" in this invention means photograph shooting by both the silver-salt camera and electronic image pickup unit, photograph shooting only by the conventional camera and photograph shooting only by the electronic image pickup unit based on shooting operation with respect to the silver-salt camera in a state in which the electronic image pickup unit is combined with the silver-salt camera.

Further, preferably, the silver-salt camera comprises a display section having a function for displaying information, and having a function for displaying image based on image data obtained by the solid image pickup element in a state in which the electronic image pickup unit is combined.

The above structure makes it possible to confirm the image taken by shooting and is useful.

Also, preferably, the electronic image pickup unit has an image transferring section for transferring image data obtained by the electronic image pickup unit to the silver-salt camera in a state in which the silver-salt camera is combined with the electronic image pickup unit, the silver-salt camera includes an image storing section for storing image data obtained by the electronic image pickup unit.

With this structure, the image data obtained by shooting by means of the electronic image pickup unit can be stored on the silver-salt camera side having relatively sufficient capacity and it is possible to make the silver-salt camera compact.

The electronic image pickup unit preferably has a curved surface which comes into contact with a member with which the electronic image pickup unit is combined, the coupling section has a curved surface which comes into contact with the curved surface of the electronic image pickup unit.

With this, it is possible to combine the electronic image pickup unit utilizing space like around the lens barrel for example.

Preferably, the silver-salt photosensitized material is a roll-shaped silver-salt photo film on which the silver-salt camera unit shoots.

Further, preferably, the silver-salt photosensitized material is an instant photograph film sheet which is irradiated with exposure light, discharged and developed, and provided with developing liquid halfway of the discharge process, the silver-salt camera is an instant camera which has a film pack mounting chamber to which a film pack having the instant photograph film sheets being laminated is mounted, shoots on the instant photograph film sheets in the film pack mounted to the film pack mounting chamber, and discharges the exposed film sheets.

Also, it is preferable in the above silver-salt camera that the electronic image pickup unit has an image transferring section which transfers image data obtained by the electronic image pickup unit to the instant camera in a state in which the electronic image pickup unit is combined with the instant camera, the instant camera includes an image storing section which stores image data obtained by the electronic image pickup unit and which is detachably mounted to the film pack mounting chamber instead of a film pack.

With this structure, the image data obtained by shooting by means of the electronic image pickup unit can be stored in the instant camera unit side having sufficient capacity, and it is possible to prevent the outward size of the camera in which they are combined from becoming large and to use it as the electronic camera having a detachable memory while utilizing a function of the instant camera.

Here, it is preferable that the coupling section can couple the silver-salt camera and the electronic image pickup unit rotated by 90° with respect to the silver-salt camera.

With this structure, it is possible to dispose the electronic image pickup unit utilizing space around the lens barrel for example.

DESCRIPTION OF THE PREFERRED EMBODIMENTS

Embodiments of a shooting system of the present invention will be explained below.

Figure 1:
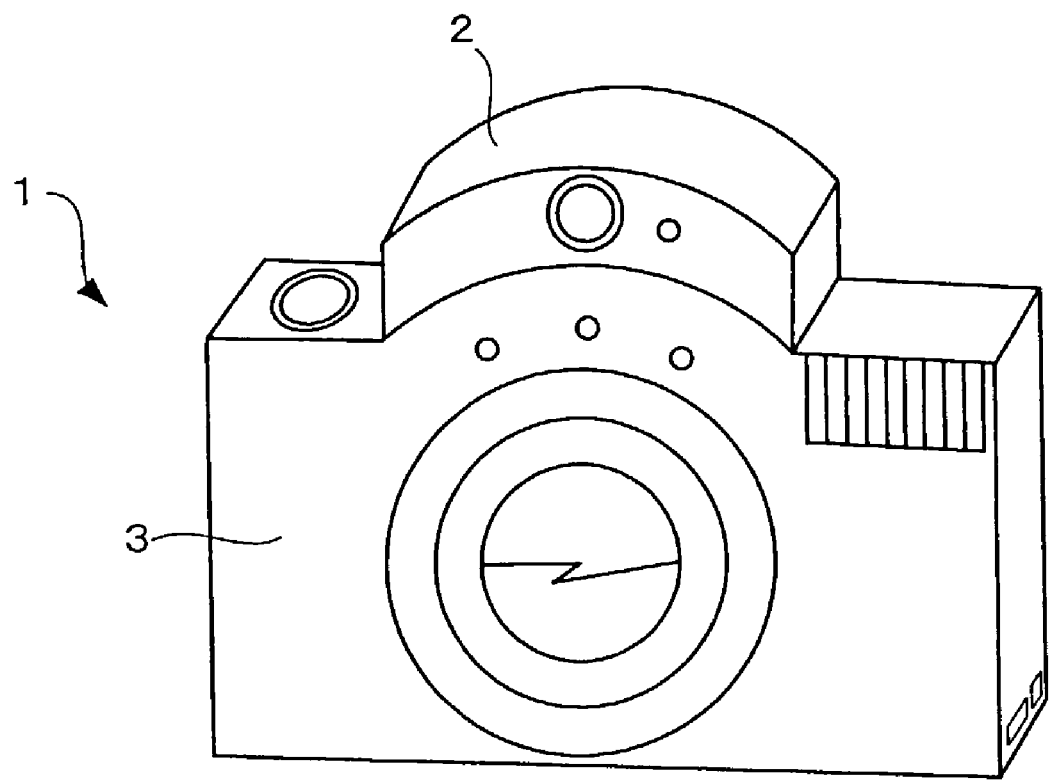
FIG. 1 is a perspective view of an outward appearance of a front surface of a first embodiment of a shooting system of the present invention as viewed from an obliquely upper direction.

FIG. 1 is a perspective view of an outward appearance of a front surface of a first embodiment of a shooting system of the present invention as viewed from an obliquely upper direction.

A shooting system 1 shown in FIG. 1 comprises an electronic camera unit 2 which forms an image of a subject on a Complementary Metal Oxide Semiconductor image pickup element (simply CMOS image pickup element, hereinafter), thereby shooting a photograph, and a compact camera unit 3 which forms an image of a subject on a mounted roll-like film, thereby shooting a photograph. In this shooting system 1, the electronic camera unit 2 is mounted on an upper surface central portion of the compact camera unit 3.

Figure 2:
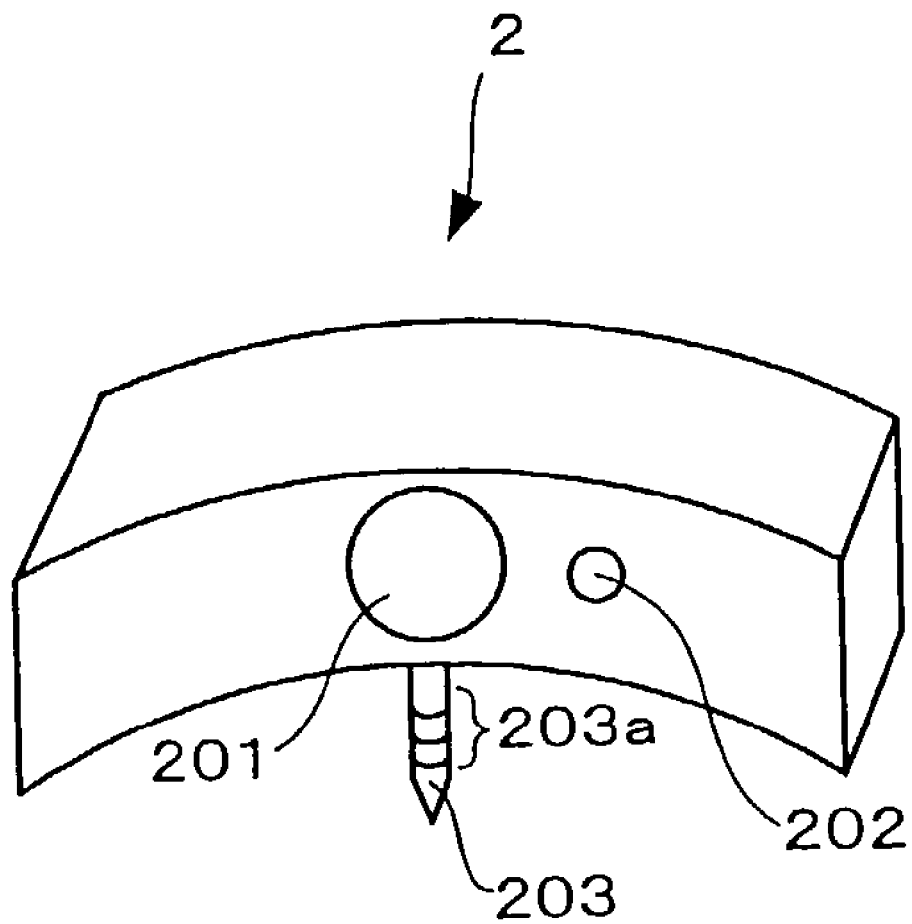
FIG. 2 is a perspective view of an outward appearance of a front surface of an electronic camera unit shown in FIG. 1 as viewed from an obliquely upper direction.

FIG. 2 is a perspective view of an outward appearance of a front surface of an electronic camera unit shown in FIG. 1 as viewed from an obliquely upper direction.

The electronic camera unit 2 shown in FIG. 2 is provided at its front surface with a shooting lens 201 and a finder object window 202.

Further, the electronic camera unit 2 shown in FIG. 2 is provided at its bottom surface with a connector 203 having a contact point 203a which is used at the time of outputting and inputting of a signal and the like to and from the compact camera unit side when the electronic camera unit 2 is mounted to the compact camera unit 3.

Figure 3:
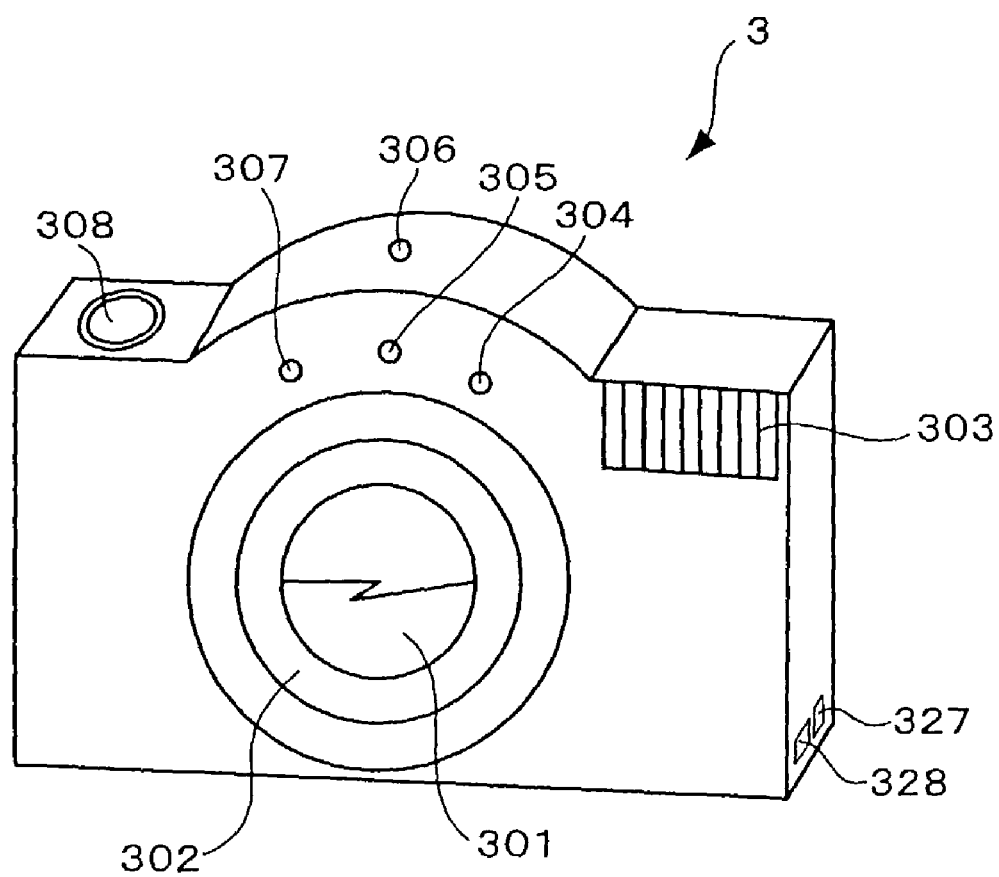
FIG. 3 is a perspective view of an outward appearance of a front surface of a compact camera unit shown in FIG. 1 as viewed from an obliquely upper direction.

FIG. 3 is a perspective view of an outward appearance of a front surface of the compact camera unit shown in FIG. 1 as viewed from an obliquely upper direction. The compact camera unit 3 shown in FIG. 3 is also the first embodiment of the silver-salt camera according to the present invention.

Provided on a front surface of the compact camera unit 3 shown in FIG. 3 are a lens barrel 302 which can telescopically project and retreat, a lens barrier 301 embedded in the lens barrel 302 for protecting a shooting lens (not shown), a flash light device 303, an AF light projecting window 304, an AF light receiving window 305 and a finder object window 307.

The compact camera unit 3 shown in FIG. 3 is provided at its upper surface with a release switch 308 and an insertion port 306 into which the connector 203 of the electronic camera unit 2 is inserted.

The compact camera unit 3 shown in FIG. 3 is provided at its left surface with a universal serial bus (USB) terminal 327 to which a USB cable sending image data stored in a later-described RAM 322 to outside is connected, and a mobile phone terminal 328 used to be connected to the mobile phone for sending the image data stored in a later-described RAM 123 to outside using the mobile phone.

Figure 4:
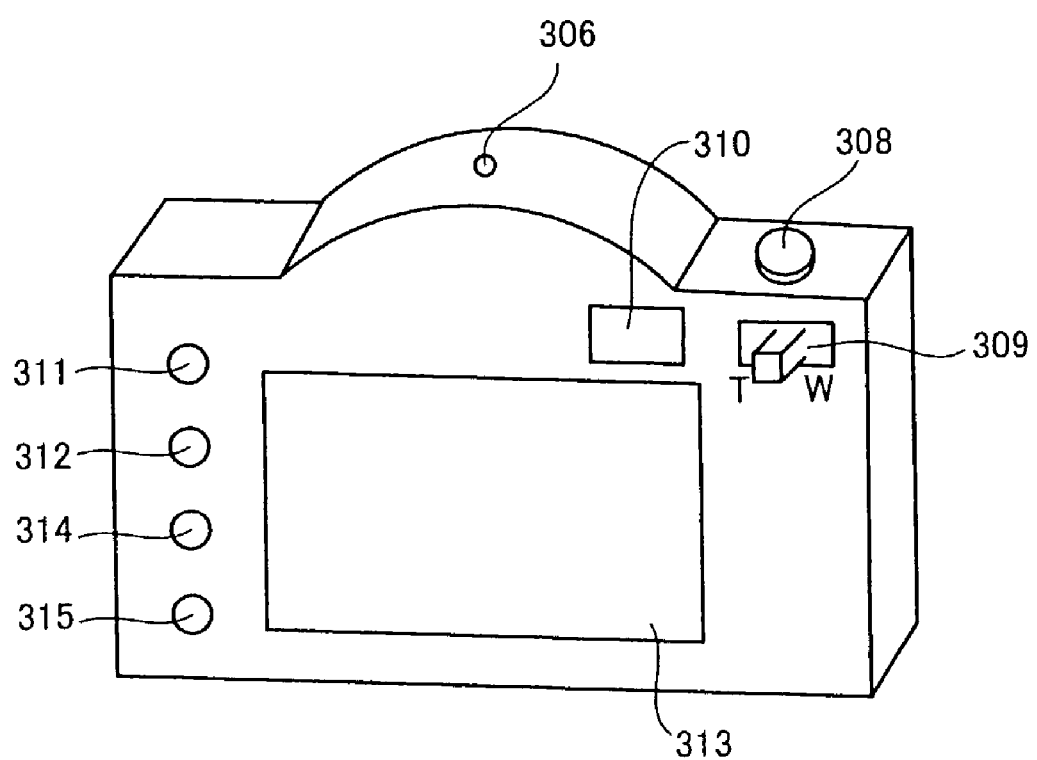
FIG. 4 is a perspective view of an outward appearance of a back surface of the compact camera unit shown in FIG. 3 as viewed from an obliquely upper direction.

FIG. 4 is a perspective view of an outward appearance of a back surface of the compact camera unit shown in FIG. 3 as viewed from an obliquely upper direction.

Information of the compact camera unit 3 is displayed on a back surface of the compact camera unit 3 shown in FIG. 4. Provided on the back surface of the compact camera unit 3 are an image display screen 313 capable of displaying image based on image data obtained by the electronic camera unit 2 when the electronic camera unit is mounted to the compact camera unit 3, a zoom switch 309 which is operated when the lens barrel 302 is telescopically projected or retreated, a finder eyepiece window 310, a power supply switch 311, and an image switch 312 which switches images to be displayed on an image display screen 313.

The compact camera unit 3 is also provided at its back surface with a switch 314. The switch 314 switches a shooting operation carried out by turning the release switch 308 ON when it is combined with the electronic camera unit 2, to a shooting operation carried out only by the mounted electronic camera unit 2, a shooting operation carried out only by the compact camera unit 3 or a shooting operation carried out by both the electronic camera unit 2 and compact camera unit 3. An OK switch 315 for instructing the RAM 322 to write the image data after the release switch 308 is turned ON is also provided on the back surface of the compact camera unit 3.

Figure 5:
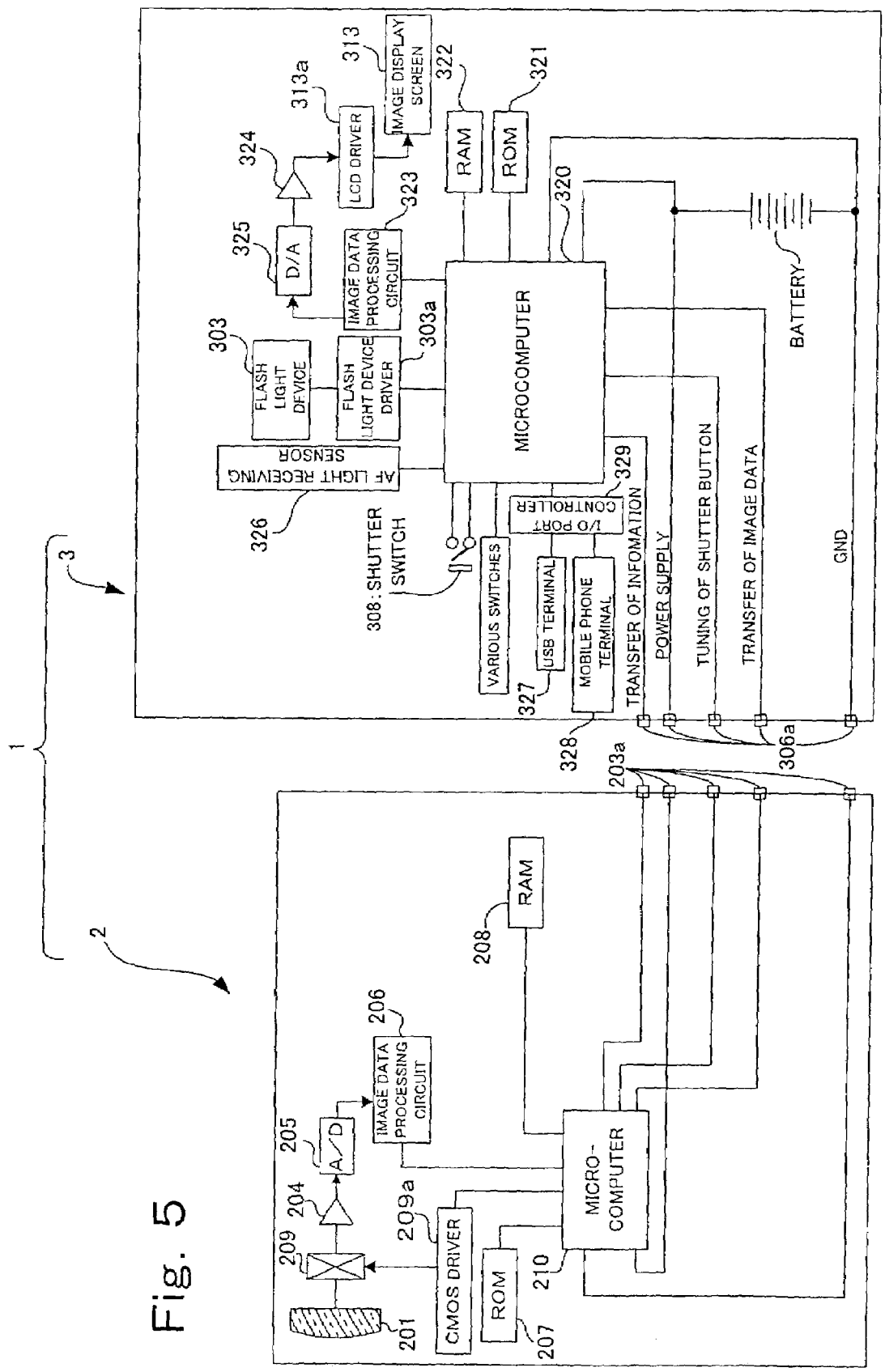
FIG. 5 is an inner block diagram of a shooting system of this embodiment.

FIG. 5 is an inner block diagram of a shooting system of this embodiment.

The electronic camera unit 2 shown on the left side of FIG. 5 comprises a shooting lens 201, a microcomputer 210 for controlling the entire electronic camera unit 2, a CMOS driver 209a for allowing a CMOS image pickup element 209 to output an image signal showing an image of a subject by driving the CMOS shooting element 209 based on instructions from the microcomputer 210, an amplifier 204 for amplifying this output image signal, and an A/D conversion circuit 205 which converts the image signal amplified by the amplifier 204 to digital image data.

The electronic camera unit 2 also comprises an image data processing circuit 206 which processes image data sent from the A/D conversion circuit 205 based on instructions of the microcomputer 210, a ROM 207 in which various adjusting data which is referred to by the microcomputer 210 when the electronic camera unit 2 is started, a RAM 208 which can store image data obtained from the image data processing circuit 206 based on storing instructions from the compact camera unit 3 by 10 frames, and a contact point 203a of the connector 203 used for transmitting a signal to the compact camera unit 3.

The compact camera unit 3 shown on the right side in FIG. 5 comprises an AF light receiving sensor 326 for measuring a distance from a subject, a flash light device 303 for emitting flash light to the subject, and a flash light device driver 303a for controlling emission of light of the flash light device 303.

The compact camera unit 3 also comprises an image data processing circuit 323 which processes image data expressing an image to be displayed on the image display screen 313, a D/A conversion circuit 325 which converts the image data processed by the image data processing circuit 323 into an analogue signal, an amplifier 324 for amplifying the analogue signal output from the D/A conversion circuit 325, and an LCD driver 313a which allows the image display screen 313 which is a liquid crystal display panel to display an image based on the analogue signal output from the amplifier 324.

The compact camera unit 3 is also provided with a microcomputer 320 for controlling the entire compact camera unit, a dry battery as a power supply, a ROM 321 in which various adjusting data referred to by the microcomputer 320 when the power supply switch 311 shown in FIG. 4 is turned ON is stored, a later-described RAM 322 in which image data transferred from the electronic camera unit 2 is stored, a contact point 306a of a connector (not shown) which receives a signal or image data from the electronic camera unit 2, an I/O port controller 329 for monitoring the USB terminal 327 and the mobile phone terminal 328, and a release switch 308. An auto-focus mechanism, a film supplying mechanism and a shutter mechanism provided in the compact camera unit 3 are omitted to prevent the drawing from being complicated.

Between the electronic camera unit 2 and the compact camera unit 3, as described above, information is transferred, electricity is supplied, the release switch is tuned and image data is transferred through connectors provided in the electronic camera unit 2 and the compact camera unit 3.

Concerning transmission of information, information concerning the number of possible shots of the electronic camera unit 2 is sent to the compact camera unit 3. This information can be displayed on the image display screen 313.

Concerning supply of electricity, electricity is supplied to the electronic camera unit 2 from the dry battery which is the power supply of the compact camera unit 3.

Concerning the tuning of the release switch, the shooting can be carried out by the compact camera unit 3 and the electronic camera unit 2 when the release switch 308 of the compact camera unit 3 is pushed down. The tuning is not carried out in a certain state of the switch 314.

Concerning the transferring of image data, image data obtained by shooting after the RAM 208 which is provided in the electronic camera unit and which can store image data of ten frames has been filled to capacity is transferred to the compact camera unit 3, and the image data is stored in the RAM 322 of the compact camera unit 3, or image data expressing image of real time obtained by the electronic camera unit 2 is transferred to the compact camera unit 3 and is displayed on the image display screen 313. The flow of operation of the shooting system 1 will be explained with reference to FIG. 6.

Figure 6:
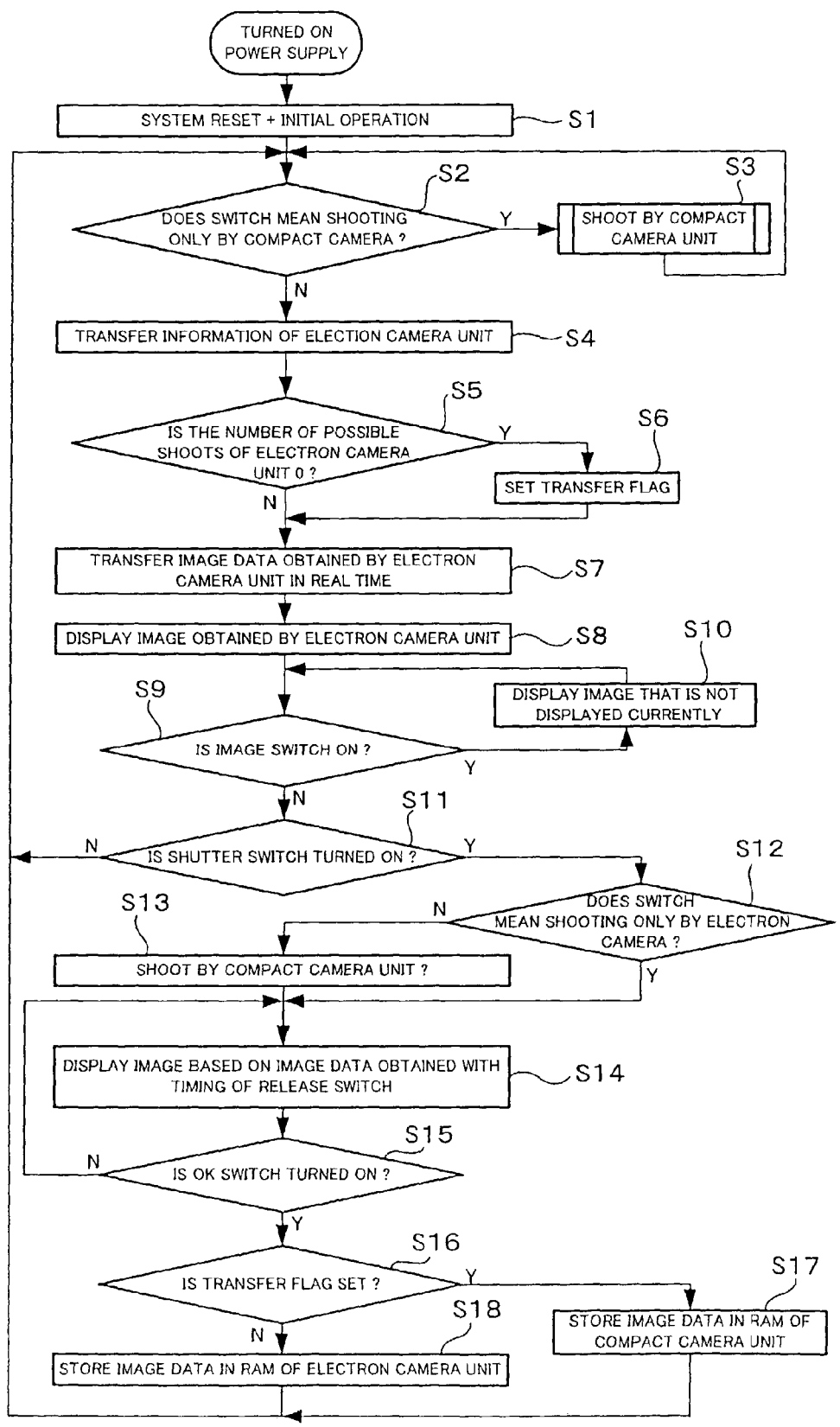
FIG. 6 is a flowchart showing a flow of operation of the shooting system of the embodiment.

FIG. 6 is a flowchart showing a flow of operation of the shooting system of the present embodiment.

FIG. 6 shows a flowchart of a "power supply ON" program started when the power supply switch 311 shown in FIG. 4 is turned ON.

If the power supply switch 311 is turned ON, the system of the electronic camera unit 2 is reset, initial operation of the compact camera unit 3 is carried out. Then, the processing is proceeded to step S2.

In step S2, it is judged whether the switch 314 of the compact camera unit 3 means that shooting is carried out only by the compact camera unit 3.

In step S2, if it is judged that the switch 314 means that shooting is carried out only by the compact camera unit 3, the processing is proceeded to step S3, where a sub-program "compact camera unit shooting" is started in preparation for shooting only by the compact camera unit 3. If the shooting is completed, the sub-program is discontinued, and the processing is returned to step S2. Since the operation of the sub-program "compact camera unit shooting" is the same as that of the normal compact camera, explanation thereof is omitted.

In step S2, if it is judged that the switch 314 does not mean shooting only by the compact camera unit 3, the processing is proceeded to step S4, where information of the electronic camera unit 2 is sent to the compact camera unit 3. Then, the processing is proceeded to step S5.

In step S5, it is judged whether the RAM 208 of the electronic camera unit 2 is filled to capacity.

In step S5, if it is judged that the RAM 208 is filled to capacity, a "transfer flag" is set. This flag means that image data obtained in the electronic camera unit 2 thereafter is transferred to the compact camera unit 3. Than, the processing is proceeded to step S7.

If it is judged that the RAM 208 is not filled to capacity in step S5, the processing is proceeded to step S7.

In step S7, image data obtained by the electronic camera unit 2 is transferred to the compact camera unit 3 in real time. Thereafter, the processing is proceeded to step S8, where an image is displayed on the image display screen 313 of the compact camera unit 3. Then, the processing is proceeded to step S9, where it is judged whether the image switch 312 shown in FIG. 4 is turned ON.

If it is judged that the image switch 312 is turned ON in step S9, the processing is proceeded to step S10, where display is switched such that all kinds of information of the electronic camera unit 2 and the compact camera unit 3, and an image based on image data sent from the electronic camera unit 2 in real time that is not currently displayed are displayed. Then, the processing is returned to step S9.

If it is judged that the image switch 312 is not turned ON in step S9, the processing is proceeded to step S11.

In step S11, it is judged whether the release switch 308 shown in FIG. 4 is turned ON, and if it is judged that the release switch 308 is not turned ON, the processing is returned to step S2.

If it is judged that the release switch 308 is turned ON in step S11, the processing is proceeded to step S12, where it is judged whether the switch 314 means shooting carried out only by the electronic camera unit 2.

If it is judged that the switch 314 means shooting carried out only by the electronic camera unit 2 in step S12, the processing is proceeded to step S14.

If it is judged that the switch 314 does not mean shooting carried out only by the electronic camera unit 2 in step S12, the processing is proceeded to step S13, where photo shooting is carried out by the compact camera unit 3. Then, the processing is proceeded to step S14.

An image based on image data obtained at ON timing of the release switch 308 is displayed on the image display screen 313 in step S14 and then, the processing is proceeded to step S15.

In step S15, it is judged whether the OK switch 315 shown in FIG. 4 is turned ON.

If it is judged that the OK switch 315 is not turned ON in step S15, the processing is returned to step S14.

If it is judged that the OK switch 315 is turned ON in step S15, the processing is proceeded to step S16, where it is judged whether the transfer flag meaning that the RAM 208 of the electronic camera unit 2 is filled to capacity is set.

If it is judged that the transfer flag is set in step S16, the processing is proceeded to step S17, where image data which is obtained in the electronic camera unit 2 with ON timing of the release switch 308 and which expresses the currently displayed image is sent to the compact camera unit 3 and stored. Then, the processing is returned to step S2.

If it is judged that the transfer flag is not set in step S16, the processing is proceeded to step S18, where the image data obtained in the electronic camera unit 2 with the ON timing of the release switch 308 is stored in the RAM 208 of the electronic camera unit 2. Then, the processing is returned to step S2.

Figure 7:
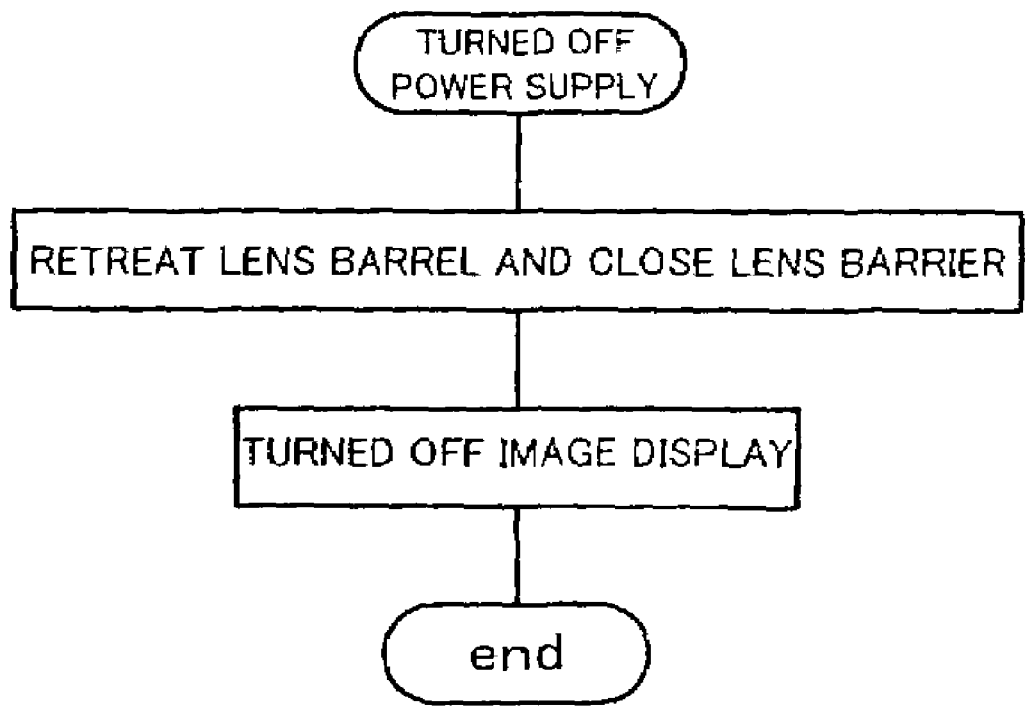
FIG. 7 is a flowchart of a "power supply OFF" program which is started when a power supply switch shown in FIG. 4 is turned OFF.

FIG. 7 is a flowchart of a "power supply OFF" program which is started when a power supply switch shown in FIG. 4 is turned OFF.

If the power supply switch 311 is turned OFF, the lens barrel 302 is retreated and the lens barrier 301 is closed in step S21. Then, the processing is proceeded to step S22, where the display of image is turned OFF. Then, this program is completed.

As explained above, according to the shooting system 1 of this embodiment, photo shooting can be carried out by both the electronic camera and the conventional silver-salt camera, and if the electronic camera unit 2 is removed, shooting by a normal camera can also be carried out. Further, photo shooting only by a silver-salt camera or photo shooting only by electronic camera can be carried out in a combined state with the electronic camera by operation of the switch 314.

In the shooting system 1 of this embodiment, image data which overflowed in the electronic camera unit 2 is transferred to the compact camera unit 3 and stored, but the overflowed image data in the electronic camera unit 2 may not be transferred to the compact camera unit 3 and the compact camera unit 3 may not have a memory for storing the image data. Although the image data is stored in the RAM 321 embedded in the compact camera unit 3 in the shooting system 1 of this embodiment, the image data may be stored in a detachable mobile memory, and the power supply may not be the dry battery, and it may be a rechargeable battery.

Next, a second embodiment of the shooting system of the present invention will be explained.

Figure 8:
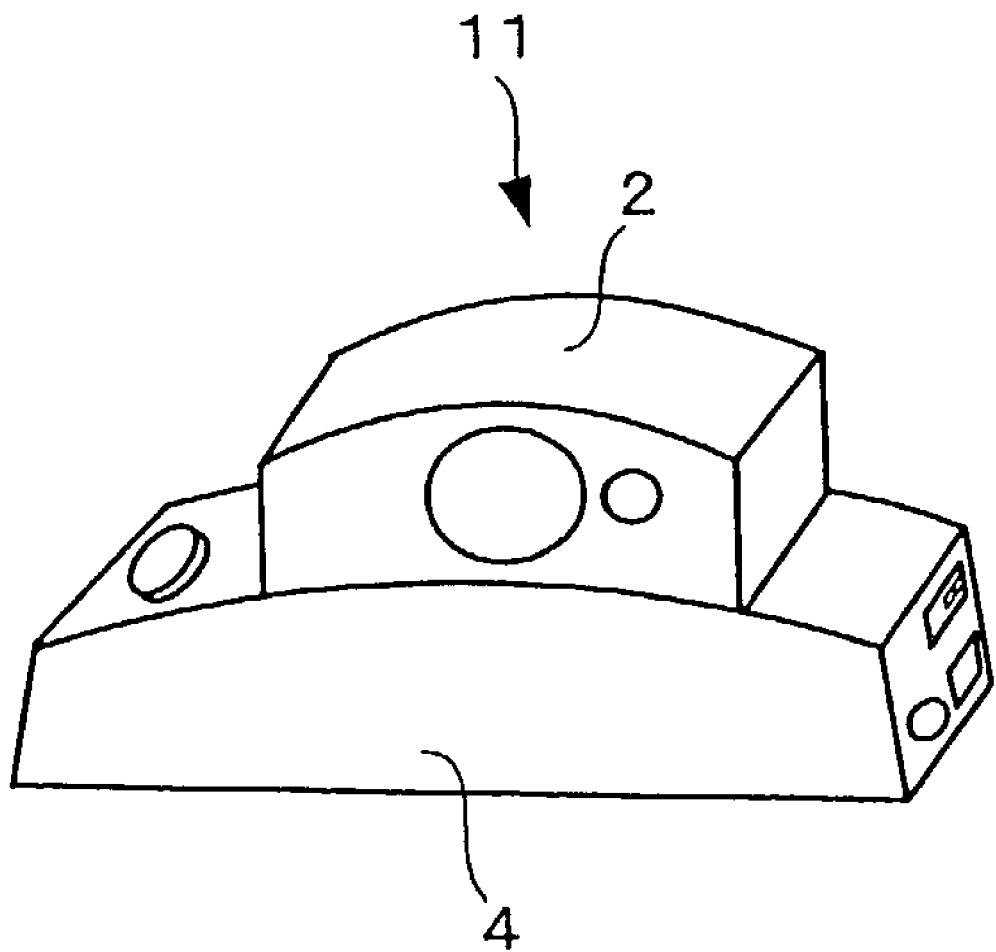
FIG. 8 is a perspective view of an outward appearance of a front surface of a second embodiment of the shooting system of the present invention as viewed from an obliquely upper direction.

FIG. 8 is a perspective view of an outward appearance of a front surface of the second embodiment of the shooting system of the present invention as viewed from an obliquely upper direction.

A shooting system 11 shown in FIG. 8 comprises the above-described electronic camera unit 2 and a control unit 4. In this shooting system 11, the electronic camera unit 2 is mounted to a central portion of an upper surface of the control unit 4.

Figure 9:
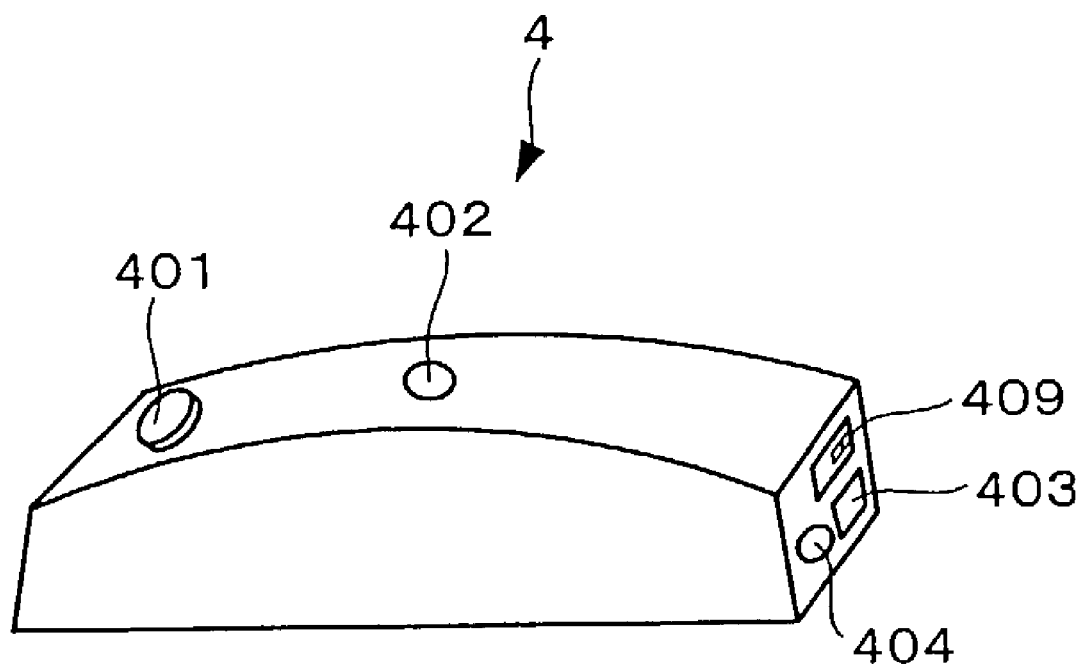
FIG. 9 is a perspective view of an outward appearance of a front surface of a control unit shown in FIG. 8 as viewed from an obliquely upper direction.

FIG. 9 is a perspective view of an outward appearance of a front surface of the control unit shown in FIG. 8.

The control unit 4 shown in FIG. 9 is provided at its upper surface with an insertion port 402 into which the electronic camera unit 2 is inserted, and a release switch 401 which is operated when shooting instructions are sent to the mounted electronic camera unit 2.

The control unit 4 is provided at its left side surface (right side in FIG. 9) with a power supply switch 409 and a USB terminal 403. To the USB terminal 403, a USB cable used for sending image data stored in a RAM 407 which will be explained later to outside and for storing music data which was compressed in a Moving Picture Experts Group Audio Layer 3 (which will simply be referred to as MPEG3, hereinafter) style from a personal computer and the like is connected. The control unit 4 is also provided at its left side surface with a stereo headphone terminal 404 for listening music replayed by the control unit 4.

Since the electronic camera unit 2 is the same as that of the first embodiment, illustration and explanation thereof are omitted.

Figure 10:
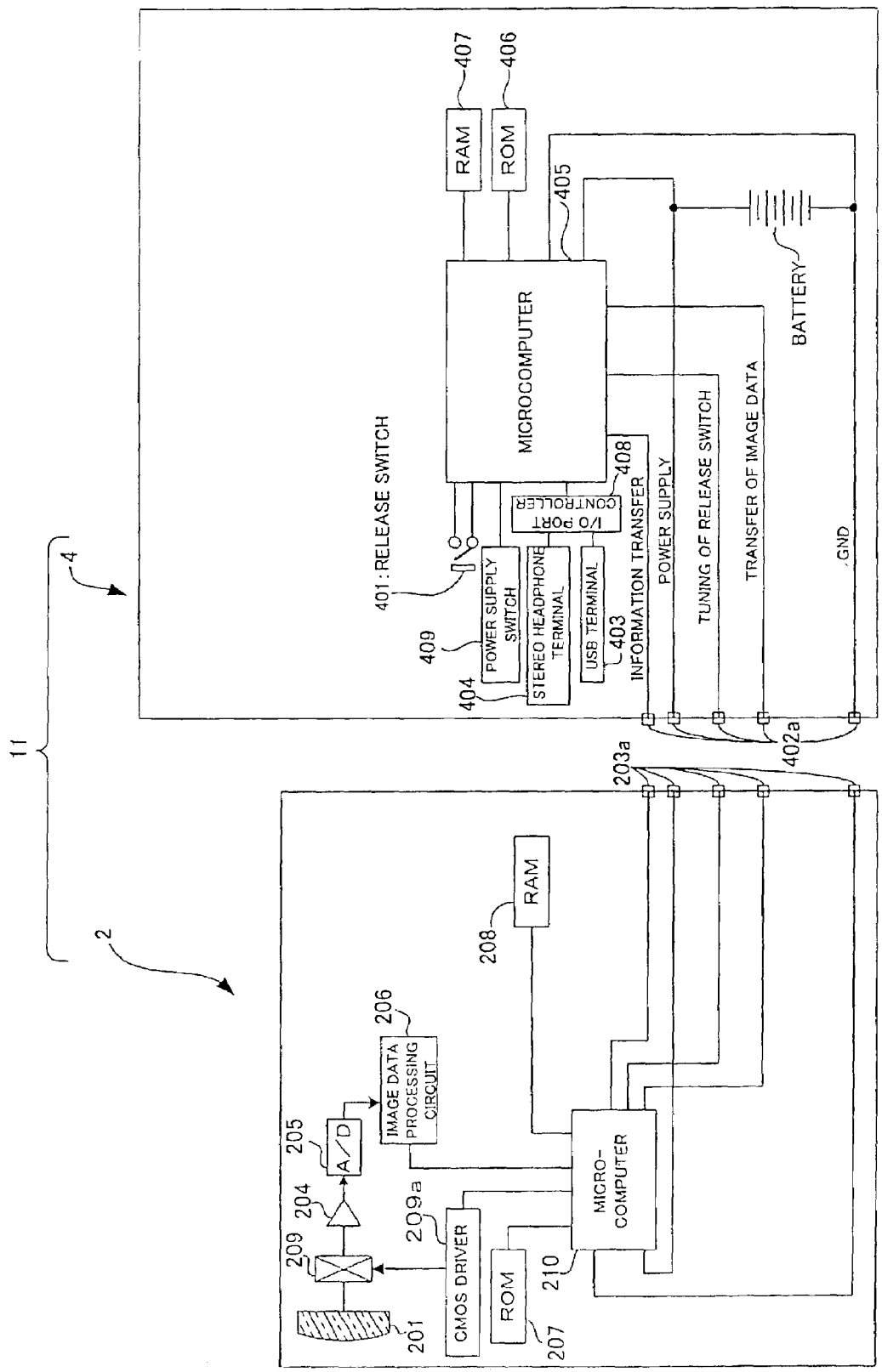
FIG. 10 is an inner block diagram of the shooting system of this embodiment.

FIG. 10 is an inner block diagram of the shooting system of this embodiment.

Since the electronic camera unit 2 shown on the left side in FIG. 10 is the same as that of the first embodiment, explanation thereof is omitted.

The control unit 4 shown on the right side in FIG. 10 is provided with a microcomputer 405 which controls the entire control unit 4, a release switch 401 which is operated when shooting is carried out by the electronic camera unit 2, a power supply switch 409 which is shown in FIG. 9 also, a RAM 407 in which image data from the electronic camera unit 2 and music data from outside are stored, as described above, a music processor 410 which reconstructs compressed music data read from the RAM 407 and converts the music data into a music replay signal, a ROM 406 in which various adjustment data referred to by the microcomputer 405 when the control unit 4 is started and application for reconstructing the compressed music data are previously stored, an I/O port controller 408 which outputs the music replay signal into the stereo headphone terminal 404 and manages input and output of data by the USB terminal 403, a rechargeable battery which is a power supply, and a contact point 402a of a connector (not shown) for inputting and outputting a signal and data to and from the electronic camera unit 2.

Between the electronic camera unit 2 and the control unit 4, as described above, information is transferred, electricity is supplied, the release switch is tuned and image data is transferred through the connectors provided in the electronic camera unit 2 and the control unit 4.

Concerning transmission of information, information concerning the number of possible shots of the electronic camera unit 2 is sent to the control unit 4.

Concerning supply of electricity, electricity is supplied to the electronic camera unit 2 from the battery which is the power supply of the control unit 4.

Concerning the tuning of the release switch, the shooting can be carried out by the electronic camera unit 2 when the release switch 401 of the control unit 4 is pushed down.

Concerning the transferring of image data, image data obtained by shooting after the RAM 208 which is provided in the electronic camera unit and which can store image data of ten frames has been filled to capacity is transferred to the control unit 4, and the image data is stored in the RAM 407 of the control unit 4. The flow of action of the shooting system 11 will be explained with reference to FIG. 11.

Figure 11:
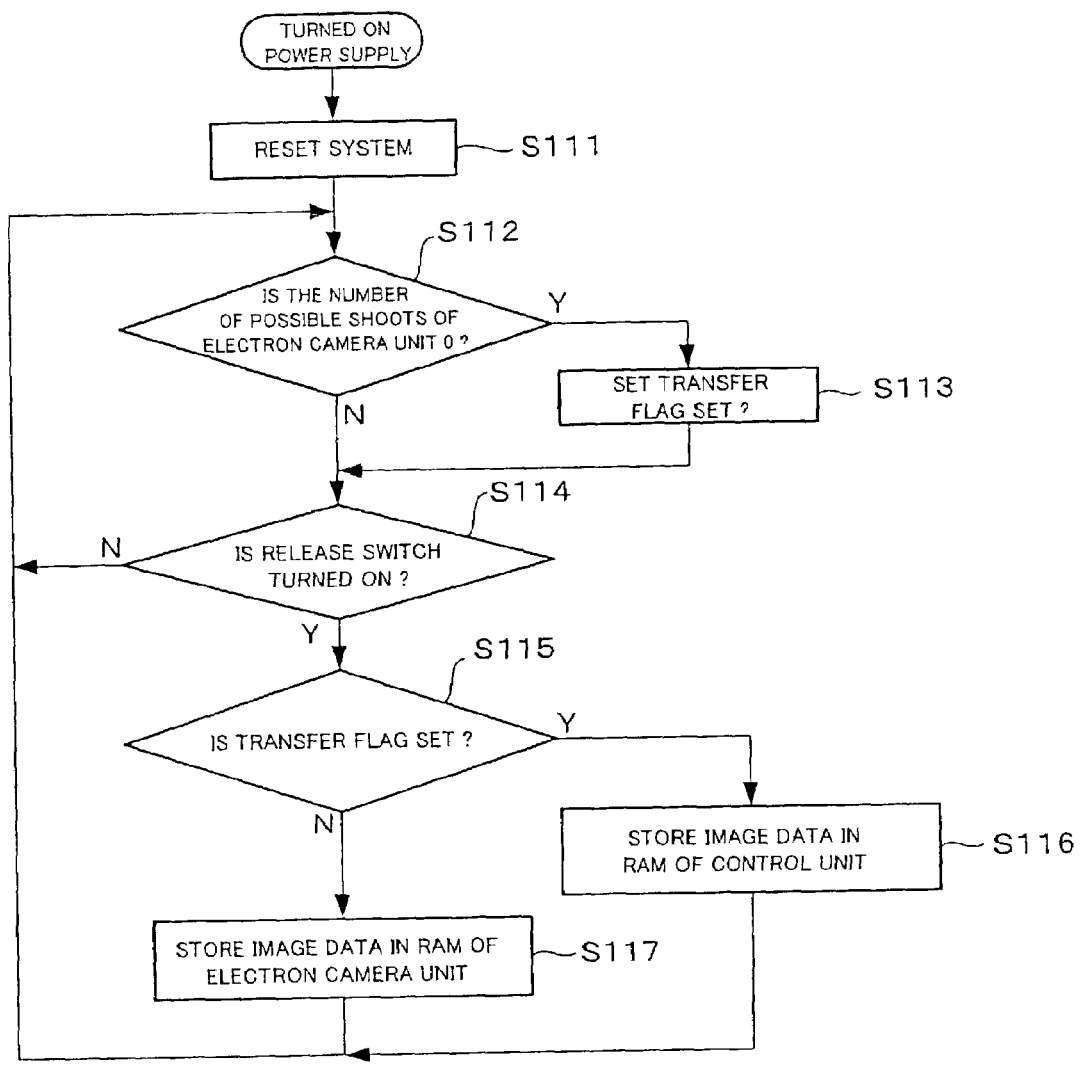
FIG. 11 is a flowchart showing a flow of operation of the shooting system of the embodiment.

FIG. 11 is a flowchart showing a flow of operation of the shooting system of the embodiment.

FIG. 11 shows the flowchart of a "power supply ON" program which is started when the power supply switch 409 shown in FIG. 9 is turned ON.

If the power supply switch 409 is turned ON, systems of the electronic camera unit 2 and the control unit 4 are reset in step S111. Then, the processing is proceeded to step S112. In step S112, it is judged whether the RAM 208 of the electronic camera unit 2 is filled to capacity with shot image data.

If it is judged that the RAM 208 is filled to capacity in step S112, the processing is proceeded to step S113, where a transfer flag meaning that the RAM 208 of the electronic camera unit 2 is filled to capacity is set. Then, the processing is proceeded to step S114.

If it is judged that the RAM 208 is not filled to capacity in step S112, the processing is proceeded to step S114, where it is judged whether the release switch 401 is turned ON. If it is judged that the release switch 401 is not turned ON, processing is returned to step S112.

If it is judged the release switch 401 is turned ON in step S114, the processing is proceeded to step S115, where it is judged that the transfer flag is set.

If it is judged that the transfer flag is set in step S115, the image data obtained in the electronic camera unit 2 is sent to the control unit 4 and then, the image data is stored in the RAM 407. Then, the processing is returned to step S112.

If it is judged that the transfer flag is not set in step S115, the processing is proceeded to step S117, where the image data obtained in the electronic camera unit 2 is stored in the RAM 208 of the electronic camera unit 2. Then, the processing is returned to step S112.

Figure 12:
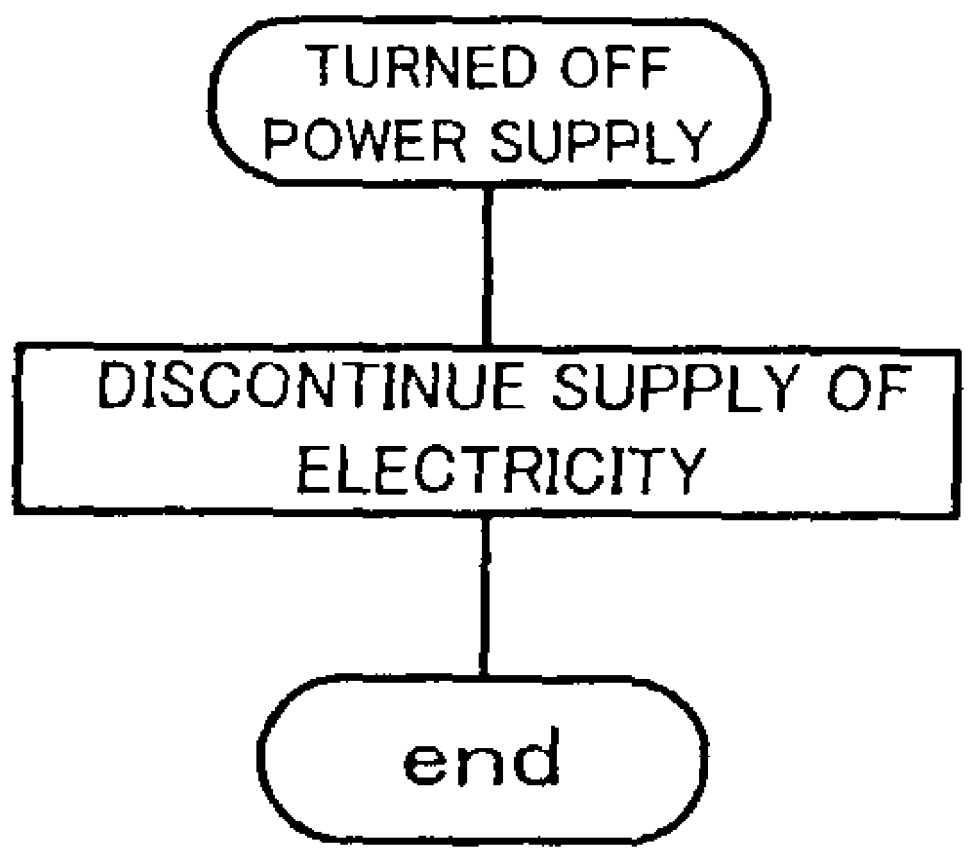
FIG. 12 is a flowchart of a "power supply OFF" program which is started when a power supply switch shown in FIG. 9 is turned OFF.

FIG. 12 is a flowchart of a "power supply OFF" program which is started when a power supply switch shown in FIG. 9 is turned OFF.

If the power supply switch 409 shown in FIG. 9 is turned OFF, supply of electricity to the electronic camera unit 2, and the like is discontinued in step S121. Then, this program is completed.

According to the shooting system 11 of this embodiment, as described above, if the electronic camera unit 2 is mounted to the control unit 4, the shooting system 11 can be used as an electronic camera. In the shooting system 11 of this embodiment, image data which overflowed in the electronic camera unit 2 is transferred to the control unit 4 and stored, but the overflowed image data in the electronic camera unit 2 may not be transferred to the control unit 4 and the control unit 4 may not have a memory for storing the image data. Although the image data is stored in the RAM 407 embedded in the control unit 4 in the shooting system 11 of this embodiment, the image data may be stored in a detachable mobile memory, and the power supply may not be a rechargeable battery, and it may be the dry battery.

Next, a third embodiment of the shooting system of the present invention will be explained.

Figure 13:
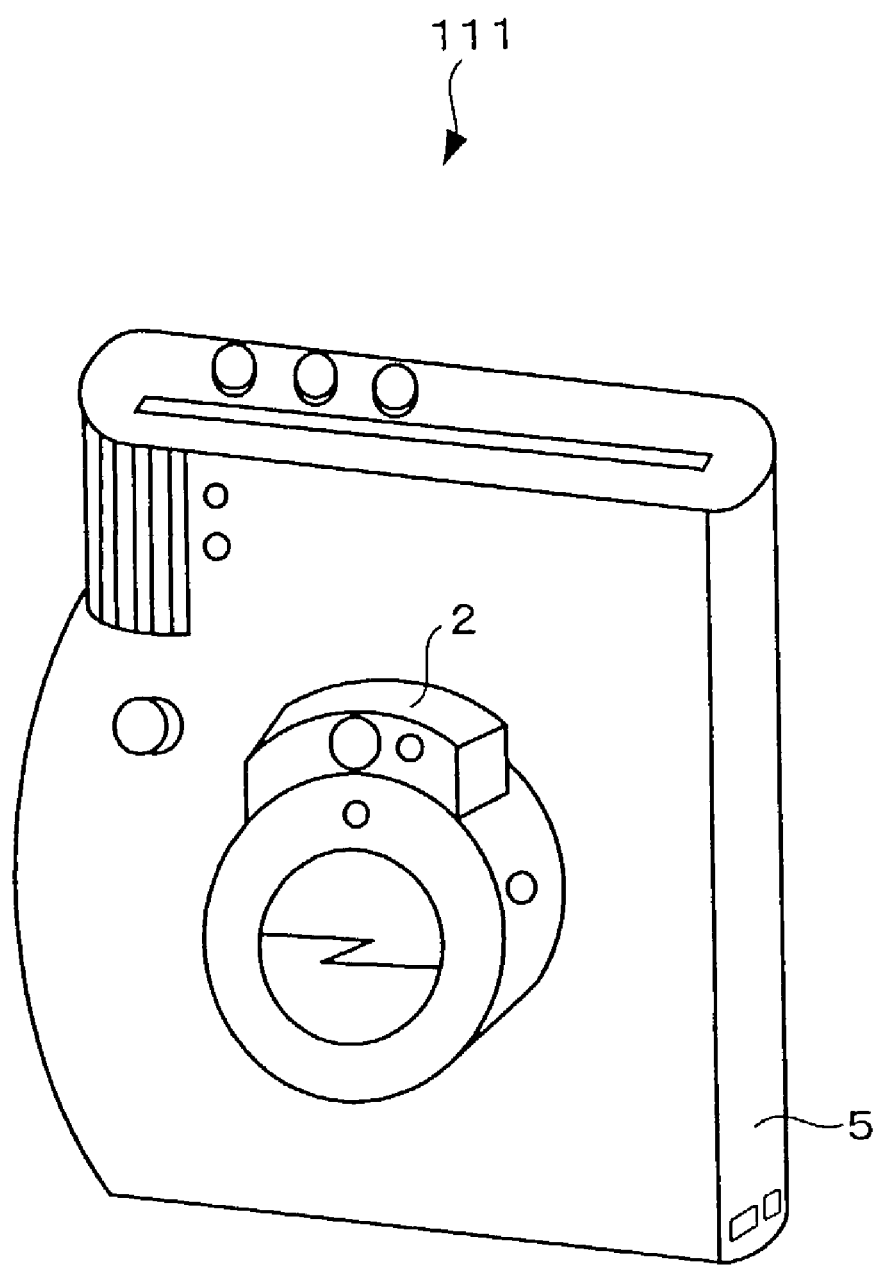
FIG. 13 is a perspective view of an outward appearance of a front surface of a third embodiment of the shooting system of the present invention as viewed from an obliquely upper direction.

FIG. 13 is a perspective view of an outward appearance of a front surface of the third embodiment of the shooting system of the present invention as viewed from an obliquely upper direction.

A shooting system 111 shown in FIG. 13 comprises the above-described electronic camera unit 2 and an instant camera unit 5. The instant camera unit 5 contains a film pack mounting chamber having a film pack comprising laminated instant photograph films therein. The instant camera unit 5 shoots on instant photograph films, and develops the film halfway through discharge of the film. In this shooting system 111, the electronic camera unit 2 is mounted directly above a lens barrel 502 of the instant camera unit 5.

Figure 14:
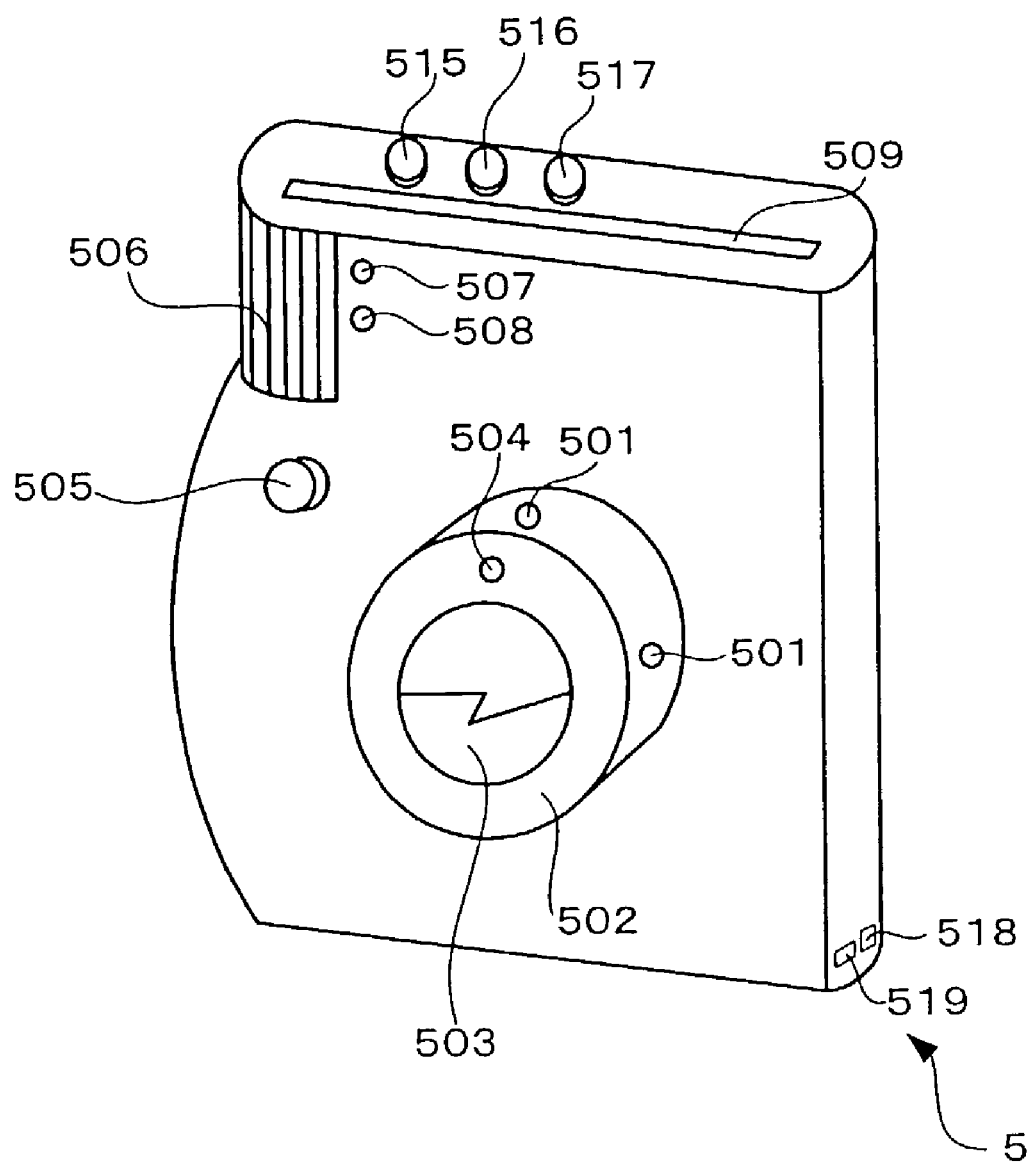
FIG. 14 is a perspective view of an outward appearance of a front surface of an instant camera unit shown in FIG. 13 as viewed from an obliquely upper direction.

FIG. 14 is a perspective view of an outward appearance of a front surface of an instant camera unit shown in FIG. 13. The instant camera unit 5 shown in FIG. 4 is also the second embodiment of the silver-salt camera according to the present invention.

The instant camera unit 5 shown in FIG. 14 is provided at the central area of its front surface with the lens barrel 502. The lens barrel 502 is provided with a lens barrier 503 for protecting a shooting lens (not shown), an AE light receiving window 504 for guiding light to an later-described AE light receiving sensor 511, and two insertion ports 501 (on just upper surface and just left side surface) for mounting the electronic camera unit 2.

The instant camera unit 5 is provided at its front surface with a flash light device 506, a flash adjusting window 508 for guiding light to a later-described flashlight receiving sensor 510, a finder object window 507 and a release switch 505.

The instant camera unit 5 is provided at its upper surface with a film sheet discharging port 509 from which a developed photo film is discharged, a power supply switch 515, and a switch 516 which switches shooting carried out by turning the release switch 505 ON when the electronic camera unit 2 is combined, from and to shooting carried out only by the mounted electronic camera unit 2, shooting carried out only by the instant camera unit 5, and shooting carried out both by the electronic camera unit 2 and the instant camera unit 5. The instant camera unit 5 is also provided at its upper surface with a far-and-near distance switch 517 which is switched by a distance to the subject.

Further, the instant camera unit 5 is provided at its left side surface with a USB terminal 518 to which a USB cable for sending image data stored in a later-described RAM 512 or RAM 602 of a memory unit 6 to outside is connected, and a mobile phone terminal 519 used when connected to a mobile phone in order to send the image data stored in such memory to outside using the mobile phone.

Figure 15:
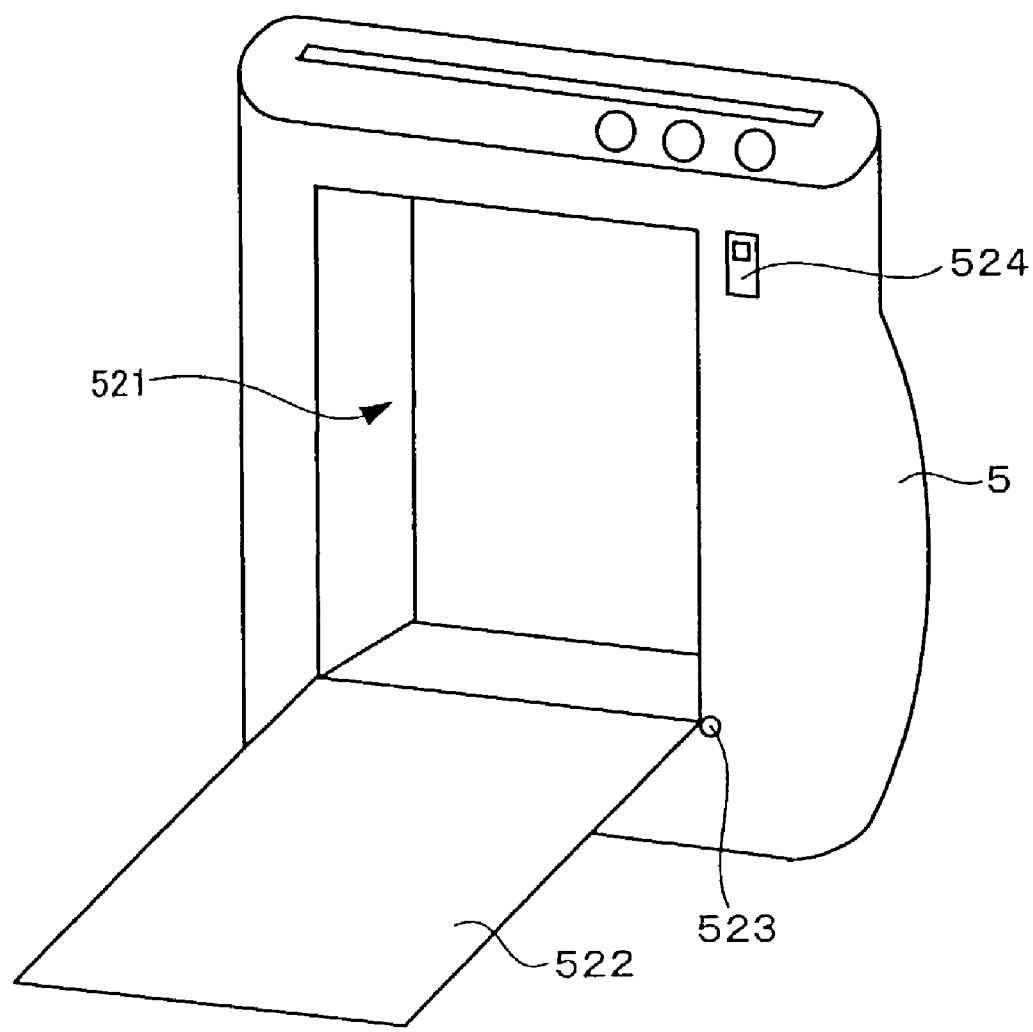
FIG. 15 is a perspective view of an outward appearance of a back surface of the shooting system shown in FIG. 13 as viewed from an obliquely upper direction.

FIG. 15 is a perspective view of an outward appearance of a back surface of the shooting system shown in FIG. 13 as viewed from an obliquely upper direction.

The shooting system 111 shown in FIG. 15 is provided at its back surface with a mounting chamber 521 to which the above-described film pack (not shown) is mounted, a back lid 522 rotatably supported by an instant camera unit body by the shaft 523, and a release button 524 which is pushed down when a locked state of a locking mechanism between the back lid 522 and the instant camera unit body is released.

Since the electronic camera unit 2 is the same as that of the first embodiment, illustration and explanation thereof are omitted.

Figure 16:
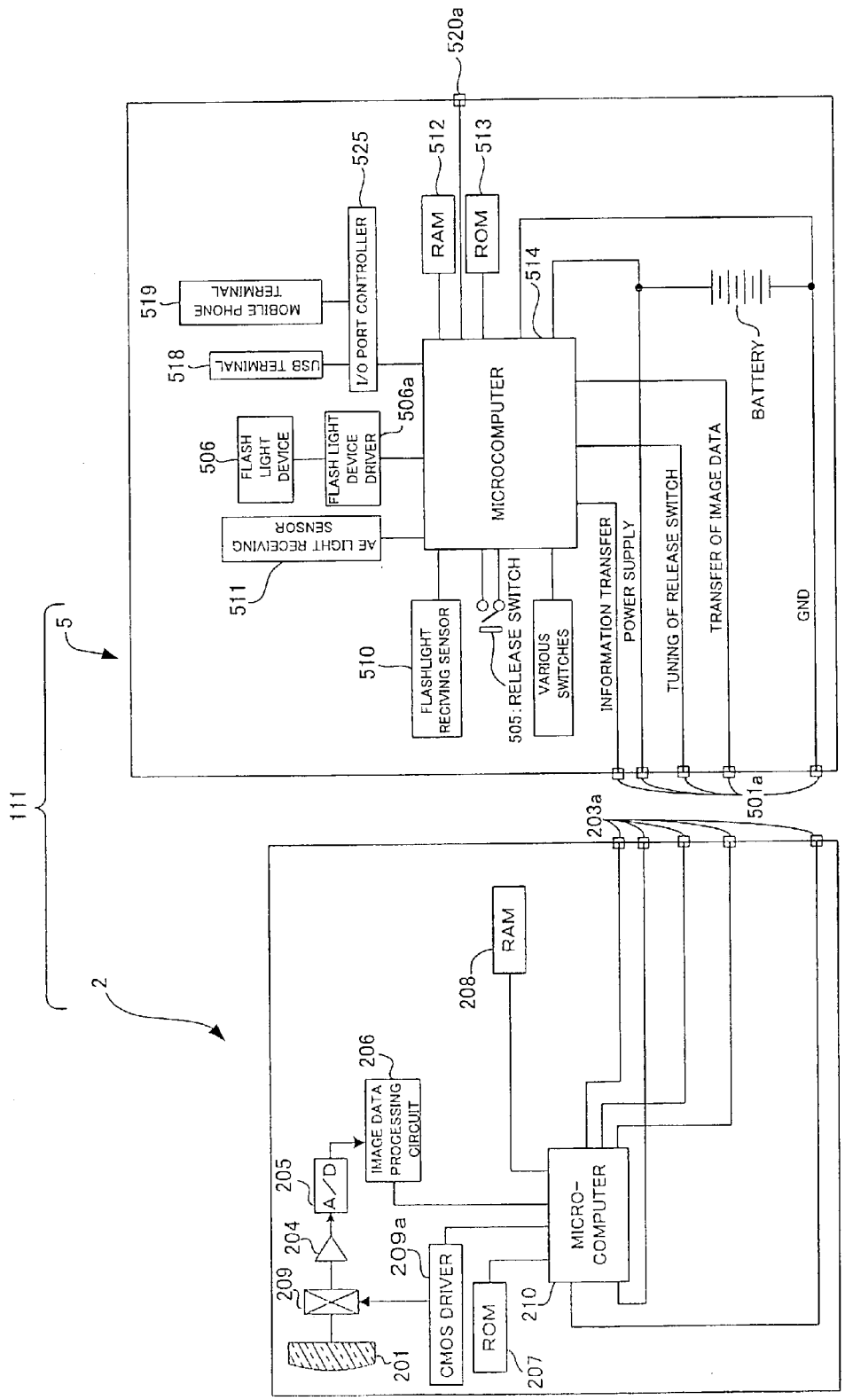
FIG. 16 is an inner block diagram of the shooting system of the embodiment.

FIG. 16 is an inner block diagram of the shooting system of the present embodiment.

The instant camera unit 5 shown on the right side in FIG. 16 is provided with an AE light receiving sensor 511 for detecting brightness of a subject, a flashlight receiving sensor 510 for measuring flash light reflected by the subject, and a flash light device driver 506a which stops emission of light of the flash light device 506 when the amount of reflected light measured by the flashlight receiving sensor 510 reaches a predetermined value.

Further, the instant camera unit 5 also includes a microcomputer 514 for controlling the entire instant camera unit, a dry battery which is a power supply, a ROM 513 in which various adjustment data referred to by the microcomputer 514 when the power supply switch 515 shown in FIG. 13 and the like is turned ON, a RAM 512 in which image data transferred from the electronic camera unit 2 is stored, a contact point 501a of a connector (not shown) used when a signal or image data is output and input from and to the electronic camera unit 2, a release switch 505, and a contact point 520a used when image data from the electronic camera unit 2 is stored in the memory unit 6 if the memory unit 6 is mounted to the mounting chamber 521 to which the film pack is mounted.

The instant camera unit 5 also includes an I/O port controller 525 which monitors a USB terminal 518 and a mobile phone terminal 519. A film supplying mechanism and a shutter mechanism provided in the instant camera unit 5 are omitted to prevent the drawing from being complicated.

Between the electronic camera unit 2 and the instant camera unit 5, as described above, information is transferred, electricity is supplied, the release switch is tuned and image data is transferred through connectors provided in the electronic camera unit 2 and the instant camera unit 5.

Concerning transferring of information, information concerning the number of possible shots of the electronic camera unit 2 is sent to the instant camera unit 5.

Concerning supply of electricity, electricity is supplied to the electronic camera unit 2 from the dry battery which is the power supply of the instant camera unit 5.

Concerning the tuning of the release switch, the shooting can be carried out by the instant camera unit 5 and the electronic camera unit 2 when the release switch 505 of the instant camera unit 5 is pushed down. The tuning is not carried out in a certain state of the switch 516.

Concerning the transferring of image data, image data obtained by shooting after the RAM 208 which is provided in the electronic camera unit and which can store image data of ten frames has been filled to capacity is transferred to the instant camera unit 5, and the image data is stored in the RAM 512 of the instant camera unit 5.

The electronic camera unit 2 shown on the left side in FIG. 16 is the same as that of the first embodiment and thus, explanation thereof is omitted.

Figure 17:
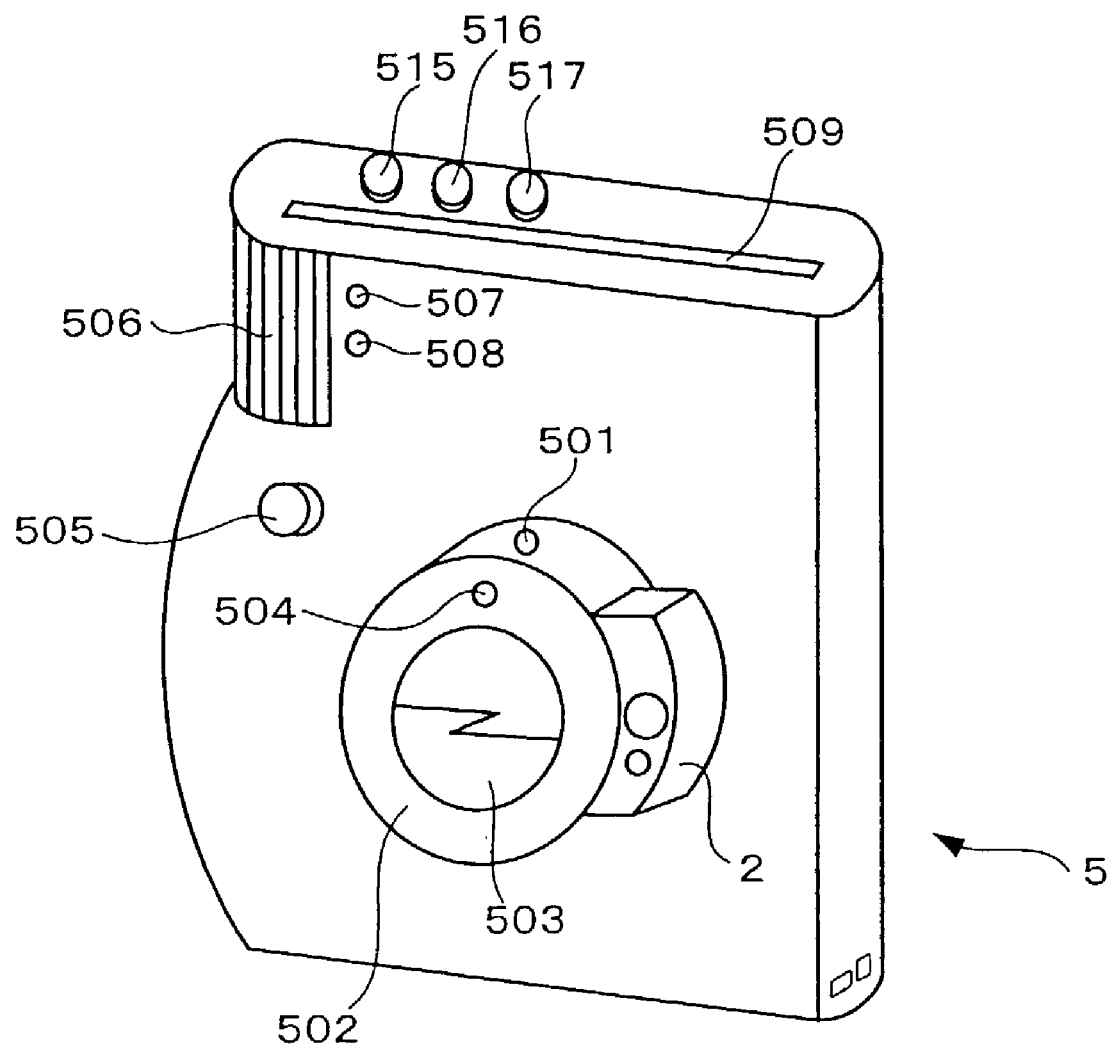
FIG. 17 is a diagram showing the shooting system of the third embodiment when the electronic camera unit is mounted to a left side surface of a lens barrel of the instant camera unit.

FIG. 17 is a diagram showing the shooting system of the third embodiment when the electronic camera unit is mounted to a just left side surface of a lens barrel of the instant camera unit.

As shown in FIGS. 13 and 17, according to the shooting system 111 of the third embodiment, the electronic camera unit 2 can be mounted on just upper surface or just left side surface (if the position on the just upper surface is rotated leftward through 90°) around the lens barrier 503 of the instant camera unit 5, and one of the two positions is selected depending upon a shape of an exposure surface of the instant photograph film sheet used in the instant camera unit 5. That is, if shooting is carried out by both the instant camera unit 5 using a film sheet having a vertically long exposure surface, and the electronic camera unit 2 mounted on the just upper surface of the lens barrier 503, since the solid image pickup element surface which is embedded in the electronic camera unit 2, and on which the subject image is formed is laterally long, image angles of photograph shot by both the instant camera unit 5 and the electronic camera unit 2 are different from each other. Thereupon, if the electronic camera unit 2 is mounted on the just left side surface of the lens barrier 503 of the instant camera unit 5, the scanning direction of the embedded image pickup element surface is switched from the horizontal direction to the vertical direction and with this, it is possible to adjust the image angle of a photograph shot by the electronic camera unit 2 to an image angle (vertically longer type) of a photograph shot by the instant camera unit.

In the shooting system 111 of this embodiment, it is possible to mount the memory unit 6 to the mounting chamber 521 shown in FIG. 15 instead of the film pack.

Figure 18:
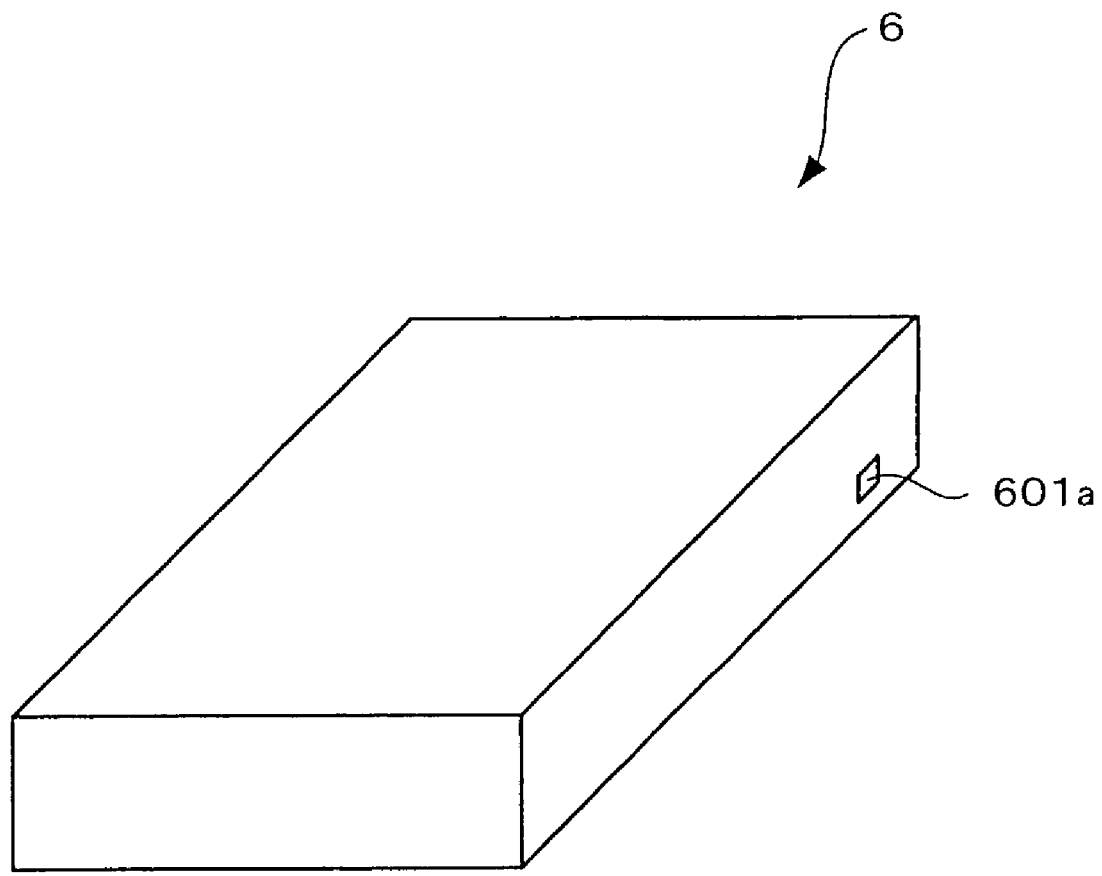
FIG. 18 is a perspective view of an outward appearance of a memory unit.

FIG. 18 is a perspective view of an outward appearance of the memory unit.

The memory unit 6 shown in FIG. 18 is provided at its side surface with a contact point 601*a* which comes into contact with a contact point 520*a* included in the instant camera unit 5 shown in FIG. 16.

If the contact point 520*a* of the instant camera unit 5 and the contact point 601*a* of the memory unit 6 come into contact with each other, image data sent to the instant camera unit 5 from the electronic camera unit 2 can be stored in the memory unit 6.

Figure 19:
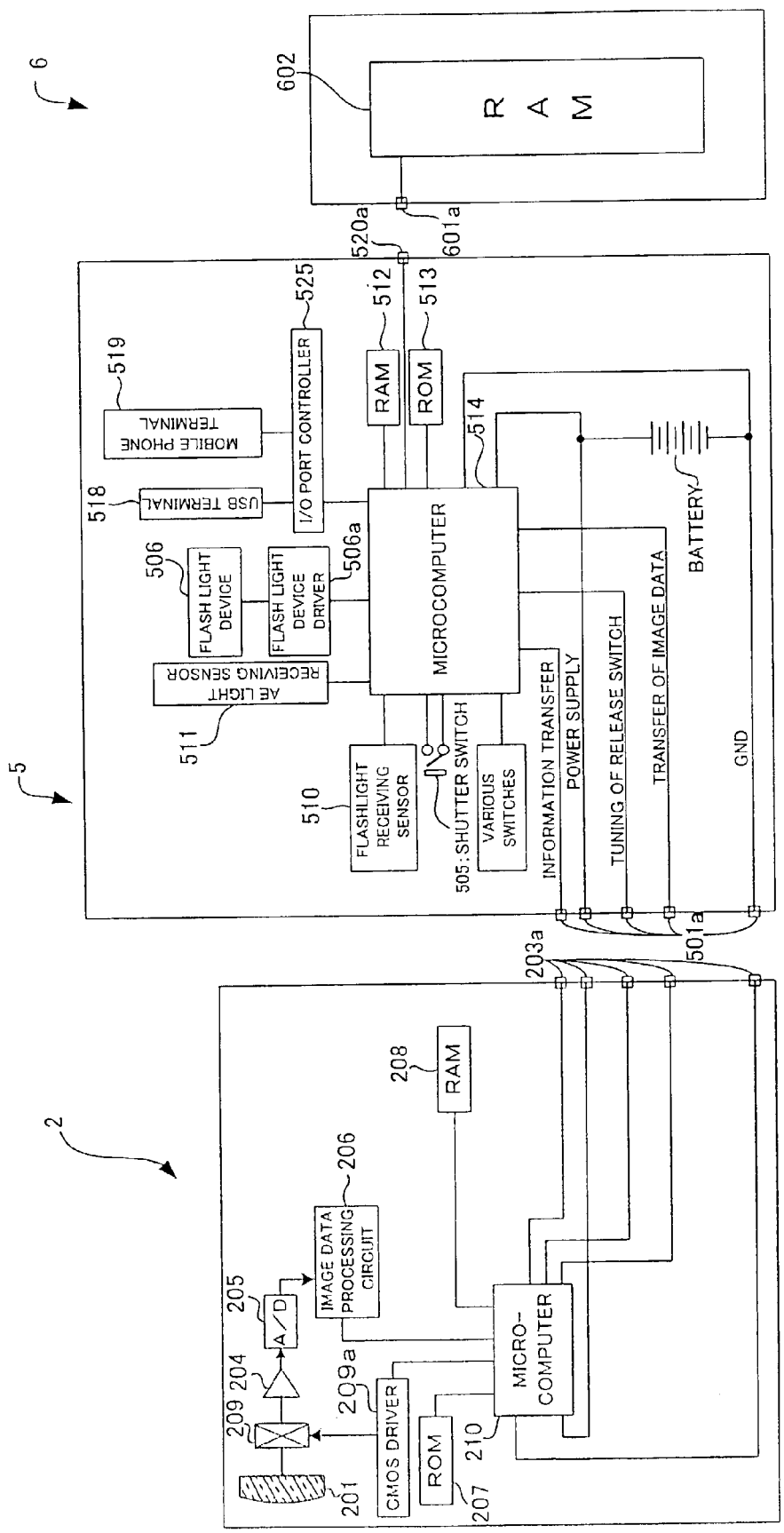
FIG. 19 is an inner block diagram of a shooting system in a state in which the memory unit is mounted in the instant camera unit having an electronic camera unit.

FIG. 19 is an inner block diagram of a shooting system in a state in which the memory unit is mounted in the instant camera unit having the electronic camera unit.

The memory unit 6 having a RAM 602 therein is shown in FIG. 19 in addition to the electronic camera unit 2 and the instant camera unit 5 shown in FIG. 16. As shown in FIG. 19, image data sent from the electronic camera unit 2 is stored in the memory unit 6 through the contact point from the microcomputer 514.

The flow of the shooting system 111 will be explained with reference to FIG. 20.

Figure 20:
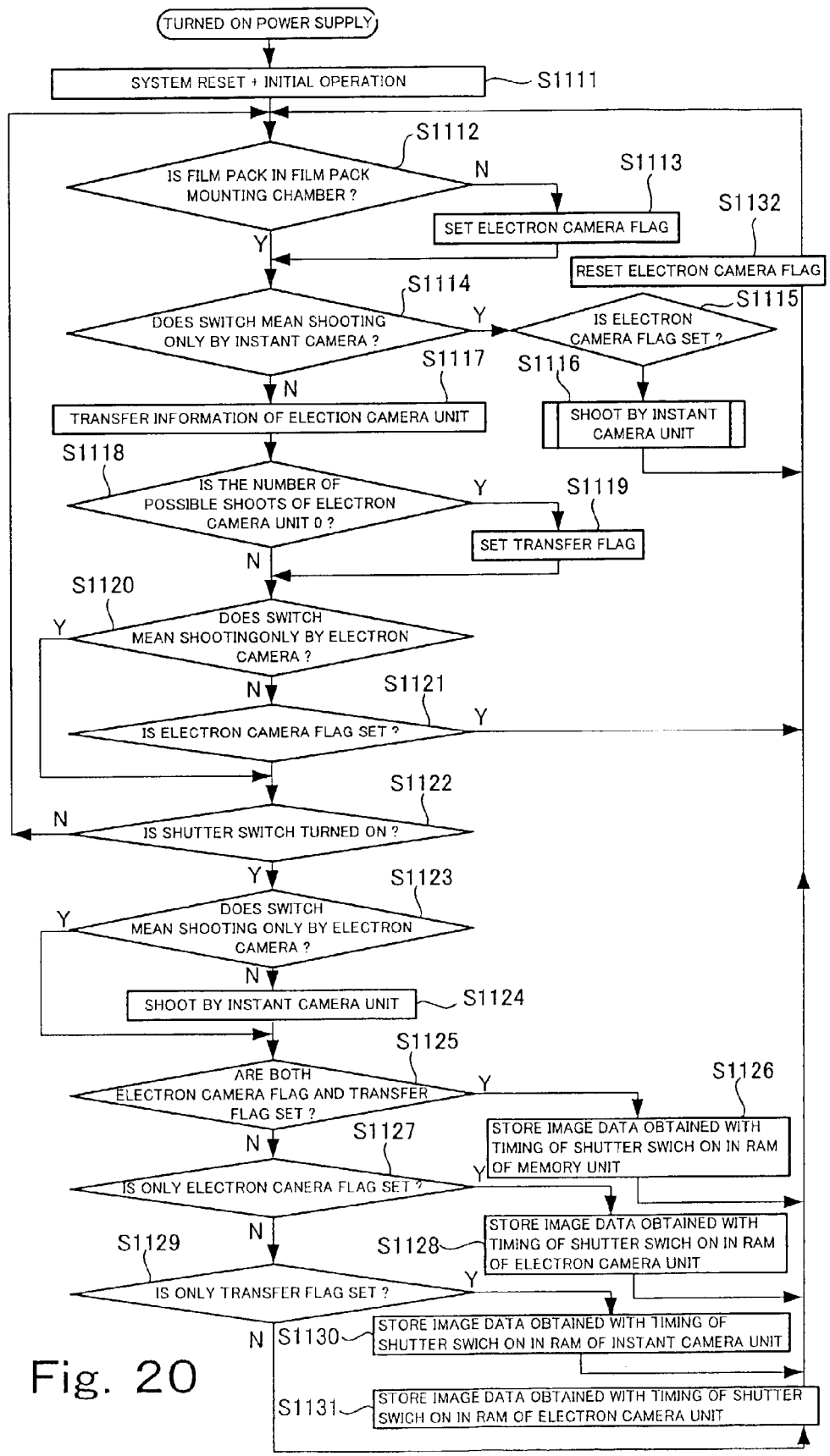
FIG. 20 is a flowchart showing a flow of operation of the shooting system.

FIG. 20 is a flowchart showing the flow of operation of the shooting system.

FIG. 20 shows the flowchart of a "power supply ON" program which is started when the power supply switch 515 shown in FIG. 13 and the like is turned ON.

If the power supply switch 515 is turned ON, the system of the electronic camera unit 2 is reset and initial operation of the instant camera unit 5 is carried out in step S1111. Then, the processing is proceeded to step S1112.

In step S1112, it is judged whether the above-described film pack is mounted to the mounting chamber 521. If it is judged that the film pack is not mounted, the processing is proceeded to step S1113, where an electronic camera flag which indicates that the memory unit 6 is mounted to the mounting chamber and that shooting can not be carried out by the instant camera unit 5 because the memory unit 6 is mounted to the mounting chamber is set. Then, the processing is proceeded to step S1114. In this embodiment, either one of the film pack and the memory pack must be mounted to the mounting chamber.

If it is judged that the film pack is mounted in step S1112, the processing is proceeded to step S1114, where it is judged whether the switch 516 shown in FIG. 13 means the shooting only by the instant camera unit 5.

If it is judged that the switch 516 means the shooting only by the instant camera unit 5 in step S1114, the processing is proceeded to step S1115, where it is judged whether the electronic camera flag is set.

If it is judged that the electronic camera flag is set in step S1115, it is regarded that the film pack is not mounted to the mounting chamber irrespective of shooting only by the instant camera unit 5, and the electronic camera flag is reset in step S1132 and then, the processing is returned to step S1112.

If it is judged that the electronic camera flag is not set in step S1115, the processing is proceeded to step S1116, where a sub-program "instant camera unit shooting" is started in preparation for the shooting only by the instant camera unit 5. If the shooting is completed, the electronic camera flag is reset in step S1132, and the processing is returned to step S1112. Since the sub-program "instant camera unit shooting" is the same as that of a normal instant camera, explanation thereof is omitted.

If it is judged that the switch 516 does not mean the shooting only by the instant camera unit 5, the processing is proceeded to step S1117, where information of the electronic camera unit 2 is sent to the instant camera unit 5. Then, the processing is proceeded to step S1118.

It is judged whether the RAM 208 of the electronic camera unit 2 is filled to capacity in step S1118.

If it is judged that the RAM 208 is filled to capacity in step S1118, a "transfer flag" meaning that image data obtained in the electronic camera unit 2 thereafter is transferred to the instant camera unit 5 is set in step S1119. Then, the processing is proceeded to step S1120.

If it is judged that the RAM 208 is not filled to capacity in step S1118, the processing is proceeded to step S1120.

It is judged whether the switch 516 means shooting only by the electronic camera unit 2 in step S1120.

If it is judged that the switch 516 means shooting only by the electronic camera unit 2 in step S1120, the processing is proceeded to step S1122.

In step S1120, if it is judged that the switch 516 does not mean shooting only by the electronic camera unit 2, i.e., if it is judged that the switch 516 means shooting by both the electronic camera unit 2 and the instant camera unit 5, the processing is proceeded to step S1121, where it is judged whether the electronic camera flag is set.

If it is judged that the electronic camera flag is set in step S1121, this state means that shooting should be carried out by both the electronic camera unit 2 and the instant camera unit 5, but since the electronic camera flag meaning that a film pack is not mounted to the mounting chamber, the switch 516 and the state of the shooting system 111 do not coincide with each other. Therefore, the electronic camera flag is reset in step S1132, and the processing is returned to step S1112.

If it is judged that the electronic camera flag is not set in step S1121, the processing is proceeded to step S1122.

It is judged whether the release switch 505 shown in FIG. 13 and the like is turned ON in step S1122, and if it is judged that the release switch 505 is not turned ON, the processing is returned to step S1112.

If it is judged that the release switch 505 is turned ON in step S1122, the processing is proceeded to step S1123, where it is judged whether the switch 516 means shooting only by the electronic camera unit 2.

If it is judged that the switch 516 means the shooting only by the electronic camera unit 2 in step S1123, the processing is proceeded to step S1125.

In step S1123, if it is judged that the switch 516 does not mean the shooting only by the electronic camera unit 2, i.e., if it is judged that the switch 516 means the shooting by both the electronic camera unit 2 and the instant camera unit 5, the processing is proceeded to step S1124, where shooting by the instant camera unit 5 is carried out. Then, the processing is proceeded to step S1125.

In step S1125, it is judged whether both a transfer flag meaning that the RAM 208 of the electronic camera unit 2 is filled to capacity and an electronic camera flag meaning that the memory unit 6 is mounted to the mounting chamber are set.

If it is judged that both the flags are set in step S1125, the processing is proceeded to step S1126, where image data obtained in the electronic camera unit 2 with ON timing of the release switch 505 is sent to the memory unit 6 and stored therein. Then, the electronic camera flag is reset in step S1132 and then, the processing is returned to step S1112.

If it is judged that both the flags are not set in step S1125, the processing is proceeded to step S1127, where it is judged whether only the electronic camera flag is set.

If it is judged that only the electronic camera flag is set in step S1127, the processing is proceeded to step S1128, where the image data obtained in the electronic camera unit 2 with the ON timing of the release switch 505 is stored in the RAM 208 of the electronic camera unit 2. Then, the electronic camera flag is reset in step S1132 and then, the processing is returned to step S1112.

If it is judged that only the electronic camera flag is not set in step S1127, the processing is proceeded to step S1129, where it is judged whether only the transfer flag is set.

If it is judged that only the transfer flag is set in step S1129, the processing is proceeded to step S1130, where the image data obtained in the electronic camera unit 2 with the ON timing of the release switch is stored in the RAM 512 of the instant camera unit 5. Then, in step S1132, the electronic camera flag is reset and then, the processing is returned to step S1112.

In step S1129, if it is judged that only the transfer flag is not set, i.e., if it is judged that both the electronic camera flag and transfer flag are not set, the processing is proceeded to step S1131, where the image data obtained in the electronic camera unit 2 with the ON timing of the release switch is stored in RAM 208 of the electronic camera unit 2. Then, the electronic camera flag is reset in step S1132 and then, the processing is returned to step S1112.

Figure 21:
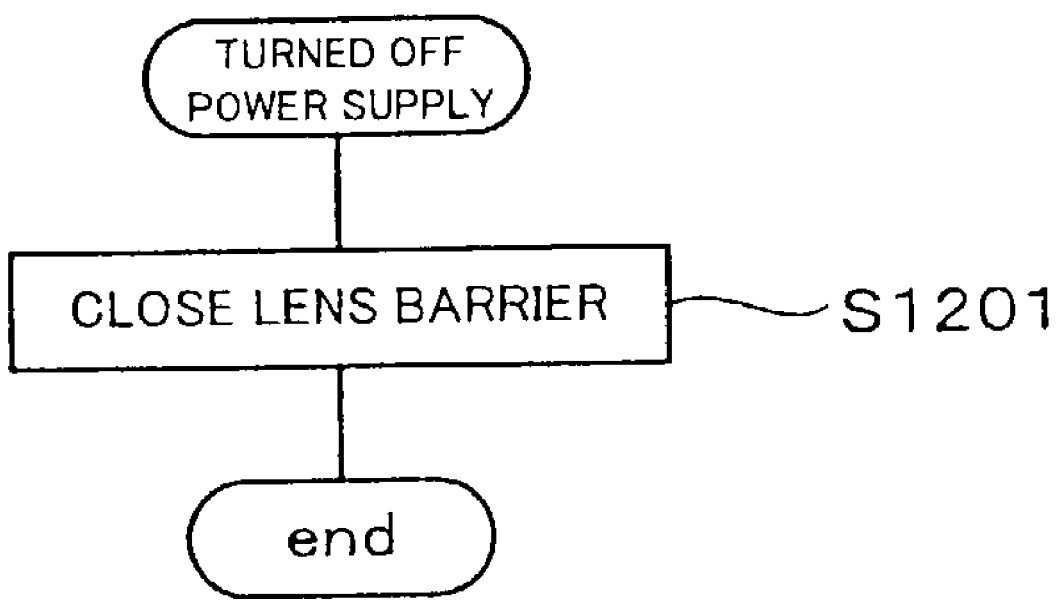
FIG. 21 is a flowchart of a "power supply OFF" program which is started when a power supply switch shown in FIG. 13 is turned OFF.

FIG. 21 is a flowchart of a "power supply OFF" program which is started when a power supply switch shown in FIG. 13 is turned OFF.

If the power supply switch 515 is turned OFF, the lens barrier 503 is closed in step S1201. Then, this program is completed.

As explained above, according to the shooting system 111 of this embodiment, photo shooting by both the electronic camera and the instant camera can be carried out, and if the electronic camera is removed, shooting by the instant camera can also be carried out. Further, shooting only by the instant camera unit 5 or only by the electronic camera unit can be carried out in a state in which the electronic camera unit 2 is combined by operation of the switch 516. Although the overflowed image data obtained in the electronic camera unit 2 is transferred to the instant camera unit 5 and stored therein according to the shooting system 111 in this embodiment, the overflowed image data in the electronic camera unit 2 may not be transferred to the instant camera unit 5 and the instant camera unit 5 may not have a memory for storing the image data. The power supply may not be the dry battery, and it may be a rechargeable battery. In the shooting system 111 of this embodiment, the mounting position of the electronic camera unit 2 is set to the just upper surface and just left side surface of the lens barrel of the instant camera unit 5, but the mounting position may be any of just upper surface and just right side surface; just lower surface and just left surface; and just lower surface and just right side surface. Further, communication of signal between the instant camera unit 5 and the memory unit 6 mounted to the mounting chamber may be carried out using infrared radiation or non-contact system. Further, an image display element for displaying an image based on image data obtained in the electronic camera unit 2 when the electronic camera unit 2 is combined may be embedded in the memory unit 6.

Although the electronic camera unit 2 has an arc bottom as shown in FIG. 2 in the first to third embodiments, the bottom of the electronic camera unit 2 may be of a shape other than arc shape. Although the USB terminal and the mobile phone terminal are provided, communication means which pursuant to Bluetooth specification may be employed instead, or communication means with outside may be omitted. The control unit 4 and the memory unit 6 may intearally be formed together and may work such that, and if the electronic camera unit 2 is combined, function of the above-described control unit can be obtained, and when mounted to the mounting chamber of the instant camera unit 5, function as a memory unit can be obtained.

What is claimed is:

1. A shooting system comprising a silver-salt camera unit to which a silver-salt photosensitized material is mounted and which shoots on the mounted silver-salt photosensitized material, and an electronic image pickup unit in which a solid image pickup element is embedded and which forms an image of a subject on the embedded solid image pickup element, thereby obtaining image data, and which is detachably combined with the silver-salt camera unit, in which in a state in which the electronic image pickup unit is combined with the silver-salt camera unit, both or one of photograph shooting onto the silver-salt photosensitized material in the silver-salt camera unit and photograph shooting by taking image data in the electronic image pickup unit can be carried out by shooting operation to the silver-salt camera unit, wherein the silver-salt camera unit comprises an electricity supplying section which supplies electricity into the silver-salt camera unit and which supplies electricity also to the electronic image pickup unit in a state in which the electronic image pickup unit is combined.

2. A shooting system according to claim 1, wherein the silver-salt camera unit comprises a display section having a function for displaying information and a function for displaying an image based on image data obtained by the solid image pickup element in a state in which the electronic image pickup unit is combined.

3. A shooting system according to claim 1, wherein the silver-salt camera unit includes an image storing section for storing image data obtained by the electronic image pickup unit, and wherein
the electronic image pickup unit includes an image transferring section for transferring image data obtained by the electronic image pickup unit to the silver-salt camera unit in a state in which the silver-salt camera unit is combined.

4. A shooting system according to claim 1, further comprising a control unit having a shooting instruction operating section for instructing the electronic image pickup unit to shoot, and an electricity supplying section for supplying electricity to the electronic image pickup unit in a state in which the electronic image pickup unit is combined with the control unit.

5. A shooting system according to claim 4, wherein
the control unit includes an image storing section which stores image data obtained by the electronic image pickup unit,
the electronic image pickup unit includes an image transferring section which transfers image data obtained by the electronic image pickup unit to the control unit in a state in which the electronic image pickup unit is combined with the control unit.

6. A shooting system according to claim 4, wherein
the control unit includes a music storing section which stores music data, and music can be replayed based on music data stored in the music storing section.

7. A shooting system according to claim 1, wherein the silver-salt photosensitized material is a roll-shaped silver-salt photo film on which the silver-salt camera unit shoots.

8. A shooting system according to claim 1, wherein the silver-salt photosensitized material is an instant photograph film sheet which is irradiated with exposure light, discharged and developed, and provided with developing liquid halfway of the discharge process,
the silver-salt camera unit is an instant camera unit which has a film pack mounting chamber to which a film pack having the instant photograph film sheets being laminated is mounted, shoots on the instant photograph film sheets in the film pack mounted to the film pack mounting chamber, and discharges the exposed film sheets.

9. A shooting system according to claim 7, further comprising an instant camera unit as well as the silver-salt camera unit which shoots on the roll-shaped silver-salt photo film, wherein the instant camera unit is combined with the electronic image pickup unit, has a film pack mounting chamber to which a film pack having the instant photograph film sheets being laminated, irradiated with exposure light, discharged, and developed after being provided with developing liquid halfway of the discharge process is mounted, shoots on the film sheets in the film pack mounted to the film pack mounting chamber, and discharges the exposed film sheets,
in a state in which the electronic image pickup unit is combined, the instant camera unit can carry out, by shooting operation to the instant camera unit, one of or both of photograph onto the film sheet in the instant camera and photograph by taking image data in the electronic image pickup unit,
the instant camera unit includes an electricity supplying section which supplies electricity into the instant camera unit and supplies electricity also to the electronic image pickup unit in a state in which the electronic image pickup unit is combined.

10. A shooting system according to claim 8, wherein the electronic image pickup unit includes an image transferring section which transfers image data obtained by the electronic image pickup unit to the instant camera unit in a state in which the electronic image pickup unit is combined with the instant camera unit,
the instant camera unit includes an image storing unit which is detachably mounted to the film pack mounting chamber instead of a film pack and which stores image data obtained by the electronic image pickup unit.

11. A shooting system according to claim 8, wherein
the instant camera unit can be coupled to the electronic image pickup unit rotated by 90° with respect to the instant camera unit.

12. A shooting system according to claim 1, wherein the electronic image pickup unit has a curved surface which comes into contact with a member with which the electronic image pickup unit is combined.

13. A silver-salt camera in which a silver-salt photosensitized material is mounted and shooting is carried out on the silver-salt photosensitized material, comprising
a coupling section which is detachably combined with an electronic image pickup unit into which a solid image pickup element is embedded, and which forms an image of a subject on the solid image pickup element to obtain image data,
an electricity supplying section which supplies electricity into the silver-salt camera, and which supplies electricity also to the electronic image pickup unit in a state in which the electronic image pickup unit is combined, and
a switching section for switching both or one of photograph shooting onto a silver-salt photosensitized material in the silver-salt camera and a photograph shooting by taking image data in the electronic image pickup unit by shooting operation to the silver-salt camera in a state in which the electronic image pickup unit is combined with the silver-salt camera.

14. A silver-salt camera according to claim 13, further comprising a display section having a function for displaying information, and having a function for displaying image based on image data obtained by the solid image pickup element in a state in which the electronic image pickup unit is combined.

15. A silver-salt camera according to claim 13, wherein
the electronic image pickup unit has an image transferring section for transferring image data obtained by the electronic image pickup unit to the silver-salt camera in a state in which the silver-salt camera is combined with the electronic image pickup unit,
the silver-salt camera includes an image storing section for storing image data obtained by the electronic image pickup unit.

16. A silver-salt camera according to claim 13, wherein
the electronic image pickup unit has a curved surface which comes into contact with a member with which the electronic image pickup unit is combined, the coupling section has a curved surface which comes into contact with the curved surface of the electronic image pickup unit.

17. A silver-salt camera according to claim 13, wherein the silver-salt photosensitized material is a roll-shaped silver-salt photo film on which the silver-salt camera unit shoots.

18. A silver-salt camera according to claim 13, wherein the silver-salt photosensitized material is an instant photograph film sheet which is irradiated with exposure light, discharged and developed, and provided with developing liquid halfway of the discharge process, the silver-salt camera is an instant camera which has a film pack mounting chamber to which a film pack having the instant photograph film sheets being laminated is mounted, shoots on the instant photograph film sheets in the film pack mounted to the film pack mounting chamber, and discharges the exposed film sheets.

19. A silver-salt camera according to claim 18, wherein the electronic image pickup unit has an image transferring section which transfers image data obtained by the electronic image pickup unit to the instant camera in a state in which the electronic image pickup unit is combined with the instant camera, the instant camera includes an image storing section which stores image data obtained by the electronic image pickup unit and which is detachably mounted to the film pack mounting chamber instead of a film pack.

20. A silver-salt camera according to claim 13, wherein the coupling section can couple the silver-salt camera and the electronic image pickup unit rotated by 90° with respect to the silver-salt camera.

\* \* \* \* \*